(12) United States Patent
Mihara

(10) Patent No.: US 7,375,902 B2
(45) Date of Patent: May 20, 2008

(54) ZOOM LENS, AND ELECTRONIC IMAGING SYSTEM USING THE SAME

(75) Inventor: Shinichi Mihara, Tama (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/487,481

(22) Filed: Jul. 17, 2006

(65) Prior Publication Data

US 2006/0268427 A1 Nov. 30, 2006

Related U.S. Application Data

(62) Division of application No. 11/218,591, filed on Sep. 6, 2005, now Pat. No. 7,145,730, which is a division of application No. 10/867,819, filed on Jun. 16, 2004, now Pat. No. 6,975,462, which is a division of application No. 10/409,172, filed on Apr. 9, 2003, now Pat. No. 6,771,432.

(30) Foreign Application Priority Data

Apr. 9, 2002 (JP) .............................. 2002-106378

(51) Int. Cl.
*G02B 15/14* (2006.01)
(52) U.S. Cl. ........................ 359/689; 359/683
(58) Field of Classification Search ......... 359/686–690
See application file for complete search history.

(56) References Cited

U.S. PATENT DOCUMENTS 3,658,411 A 4/1972 Price
6,104,432 A 8/2000 Nakamura et al.
6,157,494 A 12/2000 Nagata
6,304,388 B1 10/2001 Shimo
6,320,701 B1 11/2001 Takatsuki
6,333,823 B1 12/2001 Ozaki et al.
6,344,932 B1 2/2002 Horiuchi (Continued)

FOREIGN PATENT DOCUMENTS

JP 06-317750 11/1994

(Continued)

OTHER PUBLICATIONS

Shashsin Kogyo (Photographic Industry) Mar. 2002 (pp. 104-105).

*Primary Examiner*—Jordan M. Schwartz
(74) *Attorney, Agent, or Firm*—Kenyon & Kenyon LLP

(57) ABSTRACT

A zoom lens with an easily bendable optical path has high optical specification performance such as a high zoom ratio, a wide-angle arrangement, a small F-number and reduced aberrations. It includes a first lens group G1 remaining fixed during zooming, a second lens group G2 having negative refracting power and moving during zooming, a third lens group G3 having positive refracting power and moving during zooming, and a fourth lens group G4 having positive refracting power and moving during zooming and focusing. The first lens group comprises, in order from an object side thereof, a negative meniscus lens component convex on an object side thereof, a reflecting optical element for bending an optical path and a positive lens. Upon focusing on an infinite object point, the fourth lens group G4 moves in a locus opposite to that of movement of the third lens group G3 during zooming.

3 Claims, 17 Drawing Sheets

U.S. PATENT DOCUMENTS

| | | |
|---|---|---|
| 6,353,504 B1 | 3/2002 | Yamamoto |
| 6,437,925 B1 | 8/2002 | Nishioka |
| 6,754,446 B2 | 6/2004 | Hagimori et al. |
| 6,870,691 B2 * | 3/2005 | Konno ................ 359/738 |
| 6,975,462 B2 | 12/2005 | Mihara |
| 7,248,293 B2 * | 7/2007 | Iwasawa ............ 348/240.3 |
| 2002/0041445 A1 | 4/2002 | Nishioka |
| 2002/0057502 A1 | 5/2002 | Ishii et al. |
| 2003/0179464 A1 | 9/2003 | Amanai |
| 2005/0030405 A1 * | 2/2005 | Morooka ............ 348/335 |

FOREIGN PATENT DOCUMENTS

| | | |
|---|---|---|
| JP | 08-248318 | 9/1996 |
| JP | 2000-131610 | 5/2000 |
| JP | 2001/059938 | 3/2001 |
| JP | 2001-305427 | 10/2001 |
| WO | WO 01/27677 | 4/2001 |

* cited by examiner

C : Cyan   M : Magenta
Ye : Yellow   G : Green

ZOOM LENS, AND ELECTRONIC IMAGING SYSTEM USING THE SAME

CROSS REFERENCES TO RELATED APPLICATIONS

This is a division of application Ser. No. 11/218,591 filed 6 Sep. 2005 now U.S. Pat. No. 7,145,730, which is a division of application Ser. No. 10/867,819 filed 16 Jun. 2004 now U.S. Pat. No. 6,975,462, which is a division of application Ser. No. 10/409,172 filed Apr. 9, 2003 now U.S. Pat. No. 6,771,432, the contents of which are incorporated herein by reference.

This application claims priority under 35 USC §119 of Japanese Application No. 2002-106378 filed in Japan on Apr. 9, 2002, the content of which is incorporated herein by reference.

BACKGROUND OF THE INVENTION

The present invention relates generally to a zoom lens and an electronic imaging system using the same, and more particularly to an electronic imaging system such as a video camera or a digital camera, the depth dimension of which is diminished by providing some contrivances to an optical system portion such as a zoom lens.

In recent years, digital cameras (electronic cameras) have received attention as the coming generation of cameras, an alternative to silver-halide 35 mm-film (usually called Leica format) cameras. Currently available digital cameras are broken down into some categories in a wide range from the high-end type for commercial use to the portable low-end type.

In view of the category of the portable low-end type in particular, the primary object of the present invention is to provide the technology for implementing video or digital cameras whose depth dimension is reduced while high image quality is ensured, and which are easy to handle.

The gravest bottleneck in diminishing the depth dimension of cameras is the thickness of an optical system, especially a zoom lens system from the surface located nearest to its object side to an image pickup plane.

Recent technologies for slimming down cameras rely primarily on a collapsible lens mount that allows the optical system to be taken out of a camera body for phototaking and received therein for carrying. Typical examples of an optical system that can effectively be slimmed down while relying on the collapsible lens mount are disclosed in JP-A's 11-194274, 11-287953 and 2000-9997. Each publication discloses an optical system comprising, in order from its object side, a first lens group having negative refracting power and a second lens group having positive refracting power, wherein both lens groups move during zooming.

SUMMARY OF THE INVENTION

According to one aspect of the present invention, there is provided a zoom lens, comprising, in order from its object side, a first lens group that remains fixed during zooming, a second lens group that has negative refracting power and moves during zooming, a third lens group that has positive refracting power and moves during zooming, and a fourth lens group that has positive refracting power and moves during zooming and focusing, characterized in that the first lens group comprises, in order from its object side, a negative meniscus lens component convex on its object side, a reflecting optical element for bending an optical path and a positive lens.

According to another aspect of the present invention, there is provided a zoom lens, comprising, in order from its object side, a first lens group that remains fixed during zooming, a second lens group that has negative refracting power and moves during zooming, a third lens group that has positive refracting power and moves during zooming, and a fourth lens group that has positive refracting power and moves during zooming and focusing, characterized in that the first lens group comprises a reflecting optical element for bending an optical path, and upon focusing on an infinite object point, the fourth lens group moves in a locus opposite to that of movement of the third lens group during zooming.

The advantages of, and the requirements, for the above arrangements used herein are now explained.

While relying upon the arrangement comprising, in order from its object side, the first lens group that remains fixed during zooming, the second lens group that has negative refracting power and moves during zooming, the third lens group that has positive refracting power and moves during zooming and the fourth lens group that has positive refracting power and moves during both zooming and focusing, the zoom lens of the present invention enables an associated camera to be immediately put into the ready state unlike a collapsible lens mount camera. To be favorable for water-proofing and dust-proofing purposes, the first lens group is designed to remain during zooming, and for considerably reducing the depth dimension of the camera, at least one reflecting optical element for bending an optical path is located in the first lens group nearest to the object side of the lens system.

However, the location of the optical path-bending reflecting optical element in the first lens group would give rise to the following two demerits.

A. The depth of an entrance pupil increases, leading unavoidably to an increase in the size of each lens element forming the first lens group that, by definition, has a large diameter.

B. The magnification of a combined system comprising the second or the third lens group that, by definition, has a zooming function and the subsequent lens group or groups is close to zero, and so the zoom ratio becomes low relative to the amount of zooming movement.

First of all, the condition necessary for bending is explained. Referring to a zoom type such as one intended herein, the location of the optical path-bending reflecting optical element in the first lens group necessarily makes the position of the entrance pupil likely to become deep, as in the case of JP-A 10-62687 or 11-258507, resulting in an increase in the size of each optical element that forms the first lens group. It is thus preferable that the first lens group comprises, in order from its object side, a negative meniscus lens component convex on its object side, a reflecting optical element for bending an optical path and a positive lens and satisfies the following conditions (1), (2), (3) and (4).

$$1.4 < -f_{11}/\sqrt{(f_W f_T)} < 2.4 \tag{1}$$

$$1.2 < f_{12}/\sqrt{(f_W f_T)} < 2.2 \tag{2}$$

$$0.8 < d/L < 2.0 \tag{3}$$

$$1.55 < n_{PRI} \tag{4}$$

Here $f_{11}$ is the focal length of the negative meniscus lens component in the first lens group, $f_{12}$ is the focal length of the positive lens element in the first lens group, $f_W$ and $f_T$ are the focal lengths of the zoom lens at the wide-angle end and the telephoto end of the zoom lens, respectively, d is an air-based length from the image side-surface of the negative meniscus lens component to the object side-surface of the positive lens element in the first lens group, as measured on the optical axis of the zoom lens, L is the diagonal length of the (substantially rectangular) effective image pickup area of an electronic image pickup device, and $n_{PRI}$ is the d-line refractive index of the medium of a prism used as the optical path-bending reflecting optical element in the first lens group.

In order to locate the entrance pupil at a shallow position thereby enabling the optical path to be physically bent, it is preferable to increase the powers of the lens elements on both sides of the first lens group, as defined by conditions (1) and (2). As the upper limits of 2.4 and 2.2 to both conditions are exceeded, the entrance pupil remains at a deep position. Hence, when it is intended to ensure some angle of view, the diameter or size of each optical element forming the first lens group becomes too large to physically bend the optical path. As the lower limits of 1.4 and 1.2 are not reached, the magnification that the lens groups subsequent to the first lens group and designed to move for zooming can have becomes close to zero, offering problems such as an increase in the amount of zooming movement or a zoom ratio drop and, at the same time, rendering correction of off-axis aberrations such as distortion and chromatic aberrations difficult.

Condition (3) is provided to determine the length necessary for the location of the optical path-bending reflecting optical element, as measured along the optical axis of the zoom lens. Although the value of this condition should preferably be as small as possible, it is understood that as the lower limit of 0.8 thereto is not reached, a light beam contributing to the formation of an image at the periphery of a screen does not satisfactorily arrive at the image plane or ghosts are likely to occur. As the upper limit of 2.0 is exceeded, it is physically difficult to bend the optical path as in the case of conditions (1) and (2).

As can be understood from the foregoing, the air-based length, d, as defined by condition (3) should preferably be cut down by using as the optical path-bending element in the first lens group a prism in which entrance and exit surfaces are formed of planar surfaces or different in curvature from the lens surfaces on both sides of the first lens group and making the refractive index of a prism medium as high as possible. As the lower limit of 1.55 to condition (4) is not reached, it is physically difficult to bend the optical path. It is also preferable that $n_{PRI}$ does not exceed 1.90. Exceeding 1.90 means that the prism costs much, and renders ghosts likely to occur.

More preferably, at least one or all of the following conditions (1)', (2)', (3)' and (4)' should be satisfied.

$1.5 < -f_{11}/\sqrt{(f_W f_T)} < 2.2$ (1)'

$1.3 < f_{12}/\sqrt{(f_W f_T)} < 2.0$ (2)'

$0.9 < d/L < 1.7$ (3)'

$1.65 < n_{PRI}$ (4)'

Even more preferably, at least one of the following conditions (1)", (2)", (3)" and (4)" should be satisfied.

$1.6 < -f_{11}/\sqrt{(f_W f_T)} < 2.0$ (1)"

$1.4 < f_{12}/\sqrt{(f_W f_T)} < 1.8$ (2)"

$1.0 < d/L < 1.5$ (3)"

$1.75 < n_{PRI}$ (4)"

Most preferably, all conditions (1)" to (4)" should be satisfied.

Further, the zoom lens of the present invention should preferably satisfy the following condition (a).

$1.8 < f_T/f_W$ (a)

Here $f_W$ is the focal length of the zoom lens at the wide-angle end, and $f_T$ is the focal length of the zoom lens at the telephoto end.

Falling short of the lower limit of 1.8 to this condition means that the zoom ratio of the zoom lens becomes lower than 1.8. More preferably in this case, the value of $f_T/f_W$ should not exceed 5.5. At greater than 5.5, the zoom ratio becomes high and the amount of the lens groups that move during zooming becomes too large. This causes the zoom lens to become large in the optical path-bending direction, and so renders it impossible to set up any compact imaging system.

Next, how to ensure any desired zoom ratio is explained. When the first lens group of the present invention has positive refracting power, the position of a principal point is evidently located nearer to the image side of the zoom lens as compared with the case where there is no optical path-bending reflecting optical element. This means that with the same refracting power, the position of an image point by the first lens group is located nearer to the image side; that is, an object point with respect to the second lens group is located at a farther position. Consequently, the magnification of the second lens group approaches zero, and the change in the focal length of the zoom lens becomes small even upon movement of the second lens group. One approach to solving this problem is to make the focal length of the first lens group short (so that the focal length of the zoom lens becomes short), whereby the focal length of the second lens group is increased to a certain degree to increase the magnification of the second lens group. According to the present invention wherein a combined system comprising the third lens group and the subsequent lens group (or groups) is also allowed to have a zooming function, if the magnifications, zoom ratios, etc. of both are artfully set, it is then possible to provide an efficient zooming of the zoom lens. Specific conditions to this end are determined by the following conditions (5), (6) and (7).

$0.4 < -\beta_{2W} < 1.2$ (5)

$0.1 < -\beta_{RW} < 0.5$ (6)

$0 < \log \gamma_R / \log \gamma_2 < 1.3$ (7)

Here $\beta_{2W}$ is the magnification of the second lens group at the wide-angle end of the zoom lens upon focused on an infinite object point, $\beta_{RW}$ is the composite magnification of a combined system comprising the third lens group and all subsequent lens groups at the wide-angle end upon focused on an infinite object point, $\gamma_2$ is $\beta_{2T}/\beta_{2W}$ provided that $\beta_{2T}$ is the magnification of the second lens group at the telephoto end of the zoom lens upon focused on an infinite object point, and $\gamma_R$ is $\beta_{RT}/\beta_{RW}$ provided that $\beta_{RT}$ is the composite magnification of a combined system comprising the third lens group and all subsequent lens groups at the telephoto end upon focused on an infinite object point.

As the lower limits of 0.4 and 0.1 to conditions (5) and (6) are not reached, any satisfactorily high zoom ratio cannot be obtained throughout the zoom lens or the moving space becomes too large, resulting in a size increase. This in turn renders correction of various aberrations difficult, partly because the focal length of the first lens group becomes too short, and partly because the Petzval sum becomes large. Exceeding the upper limit of 1.3 to condition (7) is not preferable because fluctuations of the F-number and exit pupil position with zooming become too large. As the lower limit of 0 is not reached, the entrance pupil becomes too deep and the bending of the optical path becomes physically difficult. In any case, any satisfactorily high zoom ratio cannot be obtained throughout the zoom lens, or the moving space becomes too large, leading to a bulky size.

More preferably, at least one or all of the following conditions (5)', (6)' and (7)' should be satisfied.

$$0.4 < -\beta_{2W} < 1.1 \quad (5)'$$

$$0.20 < -\beta_{RW} < 0.45 \quad (6)'$$

$$0.15 < \log \gamma_R / \log \gamma_2 < 1.2 \quad (7)'$$

Even more preferably, at least one of the following conditions (5)", (6)" and (7)" should be satisfied.

$$0.6 < -\beta_{2W} < 1.0 \quad (5)''$$

$$0.25 < -\beta_{RW} < 0.4 \quad (6)''$$

$$0.25 < \log \gamma_R / \log \gamma_2 < 1.0 \quad (7)''$$

In order to satisfy conditions (5), (6) and (7), the following conditions (8) and (9), too, should preferably be satisfied.

$$1.6 < f_1 / \sqrt{(f_W \cdot f_T)} < 6.0 \quad (8)$$

$$1.1 < -f_2 / \sqrt{(f_W \cdot f_T)} < 2.2 \quad (9)$$

Here $f_1$ is the focal length of the first lens group, $f_2$ is the focal length of the second lens group, and $f_W$ and $f_T$ are the focal lengths of the zoom lens at the wide-angle and the telephoto end, respectively.

As the upper limit to condition (8) is exceeded, any satisfactorily high magnification cannot be obtained throughout the zoom lens or the moving space becomes too large, leading to a bulky size. As the lower limit is not reached, correction of off-axis aberrations and chromatic aberrations becomes difficult.

As the upper limit of 2.2 to condition (9) is exceeded, zooming efficiency becomes high thanks to an increase in the magnification of the second lens group; however, the efficiency may rather decrease because the amount of movement to obtain the same zoom ratio is proportional to the focal length. As the lower limit of 1.1 is not reached, the magnification of the second lens group comes close to zero, ending up with a zooming efficiency drop.

More preferably, the following conditions (8)' and/or (9)' should be satisfied.

$$1.9 < f_1 / \sqrt{(f_W \cdot f_T)} < 4.5 \quad (8)'$$

$$1.2 < -f_2 / \sqrt{(f_W \cdot f_T)} < 2.0 \quad (9)'$$

Even more preferably, the following conditions (8)" and/or (9)" should be satisfied.

$$2.2 < f_1 / \sqrt{(f_W \cdot f_T)} < 3.0 \quad (8)''$$

$$1.3 < -f_2 / \sqrt{(f_W \cdot f_T)} < 1.8 \quad (9)''$$

Most preferably, both conditions (8)" and (9)" should be satisfied.

As the second lens group is designed with a high magnification, another problem arises. The magnification of the second lens group becoming high means that an object point with respect to a combined system that comprises the third lens group and the subsequent lens group or groups and has another zooming function is located at a farther position and the magnification of the combined system comes close to zero, resulting in a drop of zooming efficiency by that combined system. There are two approaches to solving this problem; one is to make the focal length of the combined system comprising the third lens group and the subsequent lens group or groups long to a certain degree, and another is to bring a principal point as close to an image point for the second lens group as possible. In the former case, the following condition (10) should preferably be satisfied.

$$0.8 < f_{RW} / \sqrt{(f_W \cdot f_T)} < 1.7 \quad (10)$$

Here $f_{RW}$ is the composite focal length of the combined system comprising the third lens group and the subsequent lens group or groups, and $f_W$ and $f_T$ are the focal lengths of the zoom lens at the wide-angle and the telephoto end, respectively.

As the lower limit of 0.8 to condition (10) is not reached, the zooming efficiency by the combined system comprising the third lens group and the subsequent lens group or groups becomes worse. As the upper limit of 1.7 is exceeded, the zooming efficiency becomes worse for the same reason as in condition (9). In the latter case, the third lens group should preferably have therein at least one converging surface that is defined by an air contact surface convex on its object side and satisfies the following condition (b) and at least one diverging surface that is located on an image side with respect to the converging surface, is defined by an air contact surface convex on its image side and satisfies the following condition (b).

$$0 < R_P / f_W < 2 \quad (b)$$

$$0 < R_N / f_W < 4 \quad (c)$$

Here $R_P$ and $R_N$ are the axial radii of curvature of the converging surface and the diverging surface, respectively. Otherwise, it is difficult to bring the principal point for the third lens group close to the image point for the second lens group.

More preferably, the following condition (10)' should be satisfied.

$$0.9 < f_{RW} / \sqrt{(f_W \cdot f_T)} < 1.5 \quad (10)'$$

Most preferably, the following condition (10)" should be satisfied.

$$1.0 < f_{RW} / \sqrt{(f_W \cdot f_T)} < 1.3 \quad (10)''$$

Particularly preferably for both the cases, the focal length of the combined system comprising the third lens group and the subsequent lens group or groups should be increased upon zooming from the wide-angle end to the telephoto end, as defined by the following condition (11).

$$1.0 < f_{RT} / f_{RW} < 2.5 \quad (11)$$

Here $f_{RW}$ is the composite focal length of the combined system comprising the third lens group and all the subsequent lens groups at the wide-angle end, and $f_{RT}$ is the composite focal length of the combined system comprising the third lens group and all the subsequent lens groups at the telephoto end.

As the lower limit of 1.0 to condition (11) is not reached, the effect of the combined system comprising the third and subsequent lens groups on zooming becomes slender, the amount of movement of the second lens group increases and the entrance pupil becomes deep, and it is difficult to bend the optical path. As the upper limit of 2.5 is exceeded, fluctuations of F-number with zooming tend to become noticeable.

More preferably, the following condition (11)' should be satisfied.

$$1.1 < f_{RT}/f_{RW} < 2.3 \tag{11)'}$$

Most preferably, the following condition (11)" should be satisfied.

$$1.2 < f_{RT}/f_{RW} < 2.1 \tag{11)"}$$

According to the method most effective for the achievement of condition (11), the third lens group that, by definition, must be located as close to the image plane as possible at the wide-angle end with a view to obtaining high zoom ratios and the lens group located nearest to the object side of the zoom lens in the subsequent lens groups (hereinafter called the fourth lens group) should rather be located as near to the object side as possible, so that upon zooming to the telephoto side, the third lens group is moved toward the object side while the fourth lens group is moved toward the image side of the zoom lens (upon focusing on an infinite object point).

Specific conditions to this end are to satisfy the following conditions (12) and (13).

$$0.20 < -M_3/M_2 < 1.50 \tag{12}$$

$$0.15 < -M_4/M_3 < 1.00 \tag{13}$$

where $M_2$ is the amount of movement of the second lens group from the wide-angle end to the telephoto end, $M_3$ is the amount of movement of the third lens group from the wide-angle end to the telephoto end, and $M_4$ is the amount of movement of the fourth lens group from the wide-angle end to the telephoto end, provided that the movement of each lens group toward the image side is of positive sign.

Exceeding the upper limit of 1.50 to condition (12) is not preferable because fluctuations of F-number and an exit pupil position with zooming become too noticeable. As the lower limit of 0.20 is not reached, the entrance pupil becomes too deep and so it is physically hard to bend the optical path. In any case, any satisfactorily high zoom ratio cannot be obtained throughout the zoom lens or the moving space becomes too large, leading to a bulky size.

As the upper limit of 1.00 to condition (13) is exceeded, the magnification of the combined system comprising the third and subsequent lens groups may become high. Since a main moving lens group is the fourth lens group for focusing, however, this is not preferable because fluctuations of magnification with focusing tend to become noticeable. As the lower limit of 0.15 is not reached, the principal point for the combined system comprising the third and subsequent lens groups is far away from the image point for the second lens group. This in turn causes a drop of zooming efficiency, or renders the focal length of the combined system comprising the third and subsequent lens group or groups likely to become long or the lens arrangement of the third and subsequent lens group or groups unreasonable, offering an obstacle to correction of aberrations.

More preferably, the following conditions (12)' and/or (13)' should be satisfied.

$$0.30 < -M_3/M_2 < 1.40 \tag{12)'}$$

$$0.20 < -M_4/M_3 < 0.80 \tag{13)'}$$

Even move preferably, the following condition (12)" or (13)" should be satisfied.

$$0.40 < -M_3/M_2 < 1.30 \tag{12)"}$$

$$0.25 < -M_4/M_3 < 0.60 \tag{13)"}$$

Most preferably, both conditions (12)" and (13)" should be satisfied.

It is noted that focusing should preferably be performed with the fourth lens group. It is then preferable to satisfy the following condition (14).

$$0.10 < D_{34W}/f_W < 0.70 \tag{14}$$

Here $D_{34W}$ is an air separation between the third lens group and the fourth lens group at the wide-angle end upon focused on an infinite object point, and $f_W$ is the focal length of the zoom lens at the wide-angle end.

As the lower limit of 0.10 to this condition is not reached, the third lens group is prone to interference with the fourth lens group for lack of any focusing space. As the upper limit of 0.70 is exceeded, conversely, the moving space for zooming tends to become insufficient.

More preferably, $$0.15 < D_{34W}/f_W < 0.60 \tag{14)'}$$

Most preferably, $$0.20 < D_{34W}/f_W < 0.50 \tag{14)"}$$

When focusing is performed by movement of the fourth lens group, on the other hand, astigmatism tends generally to be placed in an ill-balanced state. This astigmatism is likely to occur especially when residual astigmatism occurring at the 1st to 3rd lens groups is corrected at the fourth lens group. Thus, both refracting surfaces of any one of the lens components forming the third lens group, inclusive of the doublet component, should be configured as aspheric surfaces. It is also preferable to incorporate at least one doublet component of a positive and a negative lens element in the third lens group because chromatic aberrations should preferably be corrected at the third lens group that has generally high light rays. It is understood that the "lens component" used herein means a lens that contacts spaces on both sides alone and has any air contact surface nowhere on the optical path, e.g., a single lens or a doublet.

The construction of the third lens group is now explained in detail.

The third lens group may be made up of, in order from its object side:

1) a doublet component consisting of a positive lens element and a negative lens element and a single lens element configured as spherical surfaces at both surfaces, two subgroups or three lens elements in all, 2) a doublet component consisting of a single lens element configured as aspheric surfaces at both surfaces and a doublet component consisting of a positive lens element and a negative lens element, two subgroups or three lens elements in all, or 3) only a doublet component consisting of a positive lens element configured as aspheric surfaces at both air contact surfaces and a negative lens element, one group or two lens elements in all.

In any case, the doublet component may serve to slack the relative decentration sensitivity between the lens elements that form the third lens group.

Corresponding to the types 1), 2) and 3) of the third lens group, it is further preferable to satisfy the following conditions (15-1), (15-2) and (15-3), respectively (with respect to correction of aberrations and slacking of decentration sensitivity).

$$1.05 < R_{C3}/R_{C1} < 3.00 \quad (15\text{-}1)$$

$$0.25 < R_{C3}/R_{C1} < 0.75 \quad (15\text{-}2)$$

$$1.20 < R_{C3}/R_{C1} < 3.60 \quad (15\text{-}3)$$

Here $R_{C1}$ is the axial radius of curvature of the surface nearest to the object side of the doublet component, and $R_{C3}$ is the axial radius of curvature of the surface nearest to the image side of the doublet component.

Exceeding the respective upper limits of 3.00, 0.75 and 3.60 to these conditions (15-1), (15-2) and (15-3) may be favorable for correction of spherical aberrations, coma and astigmatism throughout the zoom lens; however, the effect of cementing on slacking of decentration sensitivity becomes slender. As the respective lower limits of 1.05, 0.25 and 1.20 are not reached, correction of spherical aberrations, coma and astigmatism throughout the zoom lens becomes difficult.

More preferably, $$1.15 < R_{C3}/R_{C1} < 2.50 \quad (15\text{-}1)'$$

$$0.30 < R_{C3}/R_{C1} < 0.65 \quad (15\text{-}2)'$$

$$1.40 < R_{C3}/R_{C1} < 3.00 \quad (15\text{-}3)'$$

Most preferably, $$1.25 < R_{C3}/R_{C1} < 2.00 \quad (15\text{-}1)''$$

$$0.35 < R_{C3}/R_{C1} < 0.55 \quad (15\text{-}2)''$$

$$1.60 < R_{C3}/R_{C1} < 2.40 \quad (15\text{-}3)''$$

Furthermore corresponding to the types 1), 2) and 3) of the third lens group, it is preferable to satisfy the following conditions (16-1) and (17-1), (16-2) and (17-2), and (16-3) and (17-3) with respect to correction of chromatic aberrations.

$$-0.7 < L/R_{C2} < 0.1 \quad (16\text{-}1)$$

$$10 < \nu_{CP} - \nu_{CN} \quad (17\text{-}1)$$

$$-0.5 < L/R_{C2} < 0.3 \quad (16\text{-}2)$$

$$20 < \nu_{CP} - \nu_{CN} \quad (17\text{-}2)$$

$$-0.9 < L/R_{C2} < -0.1 \quad (16\text{-}3)$$

$$10 < \nu_{CP} - \nu_{CN} \quad (17\text{-}3)$$

Here L is the diagonal length in mm of an effective image pickup area of the electronic image pickup device, $R_{C2}$ is the axial radius of curvature of a cementing surface of the doublet component in the third lens group, $\nu_{CP}$ is the d-line based Abbe number of a medium of the positive lens element of the doublet component in the third lens group, and $\nu_{CN}$ is the d-line based Abbe number of a medium of the negative lens element of the doublet component in the third lens group with the proviso that the electronic image pickup device is used in such a way as to include an angle of view of 55° or greater at the wide-angle end.

Falling short of the respective lower limits of −0.7, −0.5 and −0.9 to conditions (16-1), (16-2) and (16-3) may be favorable for correction of longitudinal chromatic aberration and chromatic aberration of magnification; however, this is not preferable because chromatic aberration of spherical aberration is likely to occur, and spherical aberrations at short wavelengths remain over-corrected even when spherical aberrations at the reference wavelength can be well corrected, causing chromatic blurring of images. As the respective upper limits of 0.1, 0.3 and −0.1 are exceeded, correction of longitudinal chromatic aberration and chromatic aberration of magnification tends to become insufficient and spherical aberrations at short wavelengths are prone to under-correction.

As the respective lower limits of 10, 20 and 10 to conditions (17-1), (17-2) and (17-3) are not reached, correction of longitudinal chromatic aberration tends to become insufficient. The upper limits to conditions (17-1), (17-2) and (17-3) may prima facie be set at 90. Any combinations of media exceeding the upper limit of 90 do not occur in nature. A preferable upper limit to $\nu_{CP} - \nu_{CN}$ is 60. Materials of greater than 60 are expensive.

More preferably, either one or both of the following conditions (16-1)' and (17-1)', (16-2)' and (17-2)', and (16-3)' and (17-3)' should be satisfied.

$$-0.6 < L/R_{C2} < 0.0 \quad (16\text{-}1)'$$

$$15 < \nu_{CP} - \nu_{CN} \quad (17\text{-}1)'$$

$$-0.4 < L/R_{C2} < 0.2 \quad (16\text{-}2)'$$

$$25 < \nu_{CP} - \nu_{CN} \quad (17\text{-}2)'$$

$$-0.8 < L/R_{C2} < -0.2 \quad (16\text{-}3)'$$

$$15 < \nu_{CP} - \nu_{CN} \quad (17\text{-}3)'$$

Even more preferably, either one of the following conditions (16-1)" and (17-1)", (16-2)" and (17-2)", and (16-3)" and (17-3)" should be satisfied.

$$-0.5 < L/R_{C2} < -0.1 \quad (16\text{-}1)''$$

$$20 < \nu_{CP} - \nu_{CN} \quad (17\text{-}1)''$$

$$-0.3 < L/R_{C2} < 0.1 \quad (16\text{-}2)''$$

$$30 < \nu_{CP} - \nu_{CN} \quad (17\text{-}2)''$$

$$-0.7 < L/R_{C2} < -0.3 \quad (16\text{-}3)''$$

$$20 < \nu_{CP} - \nu_{CN} \quad (17\text{-}3)''$$

Most preferably, both of the above conditions (16-1)" and (17-1)", (16-2)" and (17-2)", and (16-3)" and (17-3)" should be satisfied.

The fourth lens group should preferably be composed of one positive lens component and satisfy the following conditions (18) and (19).

$$-4.00 < (R_{4F} + R_{4R})/(R_{4F} - R_{4R}) < 0.0 \quad (18)$$

$$0.10 < L/f_4 < 0.70 \quad (19)$$

Here $R_{4F}$ is the axial radius of curvature of the object side-surface of the positive lens component, $R_{4R}$ is the axial radius of curvature of the image side-surface of the positive lens component, L is the diagonal length of an effective image pickup area of the electronic image pickup device, and $f_4$ is the focal length of the fourth lens group.

Exceeding the upper limit of 0.0 to condition (18) is not preferable for zooming efficiency because a principal point for the combined system comprising the third and subsequent lens groups tends to be far away from the image point by the second lens group. As the lower limit of −4.00 is not reached, fluctuations of astigmatism with focusing tend to become large.

As the upper limit of 0.70 to condition (19) is exceeded, the third and fourth lens groups cannot move in opposite directions during zooming. Falling short of the lower limit of 0.10 is not preferable because the amount of movement of the fourth lens group for focusing becomes too large.

More preferably, either one or both of the following conditions (18)' and (19)' should be satisfied.

$$-3.60 < (R_{4F}+R_{4R})/(R_{4F}-R_{4R}) < -0.40 \quad (18)'$$

$$0.15 < L/f_4 < 0.60 \quad (19)'$$

Even more preferably, either one of the following conditions (18)" and (19)" should be satisfied.

$$-3.20 < (R_{4F}+R_{4R})/(R_{4F}-R_{4R}) < -0.80 \quad (18)''$$

$$0.20 < L/f_4 < 0.50 \quad (19)''$$

Most preferably, both of the above conditions (18)" and (19)" should be satisfied.

For the second lens group having a long focal length, it should be only composed of, in order from its object side, a negative lens element and a positive lens element, two lens elements in all. In conjunction with the first lens group, it is preferable to satisfy the following conditions (20) and (21).

$$-0.80 < (R_{1PF}+R_{1PR})/(R_{1PF}-R_{1PR}) < 0.90 \quad (20)$$

$$-0.10 < (R_{2NF}+R_{2NR})/(R_{2NF}-R_{2NR}) < 2.00 \quad (21)$$

Here $R_{1PF}$ is the axial radius of curvature of the object side-surface of the positive lens component in the first lens group, $R_{1PR}$ is the axial radius of curvature of the image side-surface of the positive component in the first lens group, $R_{2NF}$ is the axial radius of curvature of the object side-surface of the negative lens component in the second lens group, and $R_{2NR}$ is the axial radius of curvature of the image side-surface of the negative lens component in the second lens group.

As the upper limit of 0.90 to condition (20) is exceeded, higher-order chromatic aberrations of magnification tend to occur, and as the lower limit of −0.80 is not reached, the entrance pupil tends to become deep.

As the upper limit of 2.00 to condition (20) is exceeded, coma tends to occur, and as the lower limit of −0.10 is not reached, barrel distortion tends to occur.

More preferably, either one or both of the following conditions (20)' and (21)' should be satisfied.

$$-0.50 < (R_{1PF}+R_{1PR})/(R_{1PF}-R_{1PR}) < 0.70 \quad (20)'$$

$$-0.20 < (R_{2NF}+R_{2NR})/(R_{2NF}-R_{2NR}) < 1.50 \quad (21)'$$

Even more preferably, either one of the following conditions (20)" and (21)" should be satisfied.

$$-0.20 < (R_{1PF}+R_{1PR})/(R_{1PF}-R_{1PR}) < 0.50 \quad (20)''$$

$$0.50 < (R_{2NF}+R_{2NR})/(R_{2NF}-R_{2NR}) < 1.00 \quad (21)''$$

Most preferably, both of the above conditions (20)" and (21)" should be satisfied.

The presumption for the electronic image pickup device used herein is that it has a total angle of view of 55° or greater at the wide-angle end. The 55 degrees are the wide-angle-end total angle of view needed commonly for electronic image pickup devices.

For the electronic image pickup device, the wide-angle-end total angle of view should preferably be 80° or smaller. At greater than 80°, distortions are likely to occur, and it is difficult to make the first lens group compact. It is thus difficult to slim down the electronic imaging system.

Thus, the present invention provides means for reducing the thickness of the zoom lens portion while satisfactory image-formation capability is maintained.

Next, how and why the thickness of filters is reduced is now explained. In an electronic imaging system, an infrared absorption filter having a certain thickness is usually inserted between an image pickup device and the object side of a zoom lens, so that the incidence of infrared light on the image pickup plane is prevented. Here consider the case where this filter is replaced by a coating devoid of thickness. In addition to the fact that the system becomes thin as a matter of course, there are spillover effects. When a near-infrared sharp cut coat having a transmittance ($\tau_{600}$) of at least 80% at 600 nm and a transmittance ($\tau_{700}$) of up to 8% at 700 nm is introduced between the image pickup device in the rear of the zoom lens system and the object side of the system, the transmittance at a near-infrared area of 700 nm or longer is relatively lower and the transmittance on the red side is relatively higher as compared with those of the absorption type, so that the tendency of bluish purple to turn into magenta—a defect of a CCD or other solid-state image pickup device having a complementary colors filter—is diminished by gain control and there can be obtained color reproduction comparable to that by a CCD or other solid-state image pickup device having a primary colors filter. In addition, it is possible to improve on color reproduction of, to say nothing of primary colors and complementary colors, objects having strong reflectivity in the near-infrared range, like plants or the human skin.

Thus, it is preferable to satisfy the following conditions (22) and (23):

$$\tau_{600}/\tau_{550} \geq 0.8 \quad (22)$$

$$\tau_{700}/\tau_{550} \leq 0.08 \quad (23)$$

where $\tau_{550}$ is the transmittance at 550 nm wavelength.

More preferably, the following conditions (22)' and/or (23)' should be satisfied:

$$\tau_{600}/\tau_{550} \geq 0.85 \quad (22)'$$

$$\tau_{700}/\tau_{550} \leq 0.05 \quad (23)'$$

Even more preferably, the following conditions (22)" or (23)" should be satisfied:

$$\tau_{600}/\tau_{550} \geq 0.9 \quad (22)''$$

$$\tau_{700}/\tau_{550} \leq 0.03 \quad (23)''$$

Most preferably, both conditions (28)" and (29)" should be satisfied.

Another defect of the CCD or other solid-state image pickup device is that the sensitivity to the wavelength of 550 nm in the near ultraviolet range is considerably higher than that of the human eye. This, too, makes noticeable chromatic blurring at the edges of an image due to chromatic aberrations in the near-ultraviolet range. Such color blurring is fatal to a compact optical system. Accordingly, if an absorber or reflector is inserted on the optical path, which is designed such that the ratio of the transmittance ($\tau_{400}$) at 400 nm wavelength to that ($\tau_{550}$) at 550 nm wavelength is less than 0.08 and the ratio of the transmittance ($\tau_{440}$) at 440 nm wavelength to that ($\tau_{550}$) at 550 nm wavelength is greater than 0.4, it is then possible to considerably reduce noises such as chromatic blurring while the wavelength range necessary for color reproduction (satisfactory color reproduction) is kept intact.

It is thus preferable to satisfy the following conditions (24) and (25):

$$\tau_{400}/\tau_{550} \leq 0.08 \qquad (24)$$

$$\tau_{440}/\tau_{550} \geq 0.4 \qquad (25)$$

More preferably, the following conditions (24)' and/or (25)' should be satisfied.

$$\tau_{400}/\tau_{550} \leq 0.06 \qquad (24)'$$

$$\tau_{440}/\tau_{550} \geq 0.5 \qquad (25)'$$

Even more preferably, the following condition (24)" or (25)" should be satisfied.

$$\tau_{400}/\tau_{550} \leq 0.04 \qquad (24)''$$

$$\tau_{440}/\tau_{550} \geq 0.6 \qquad (25)''$$

Most preferably, both condition (24)" and (25)" should be satisfied.

It is noted that these filters should preferably be located between the image-formation optical system and the image pickup device.

On the other hand, a complementary colors filter is higher in substantial sensitivity and more favorable in resolution than a primary colors filter-inserted CCD due to its high transmitted light energy, and provides a great merit when used in combination with a small-size CCD.

To shorten and slim down the optical system, the optical low-pass filter that is another filter, too, should preferably be thinned as much as possible. In general, an optical low-pass filter harnesses a double-refraction action that a uniaxial crystal like berg crystal has. However, when the optical low-pass filter includes a quartz optical low-pass filter or filters in which the angles of the crystal axes with respect to the optical axis of the zoom lens are in the range of 35° to 55° and the crystal axes are in varying directions upon projected onto the image plane, the filter having the largest thickness along the optical axis of the zoom lens among them should preferably satisfy the following condition (26) with respect to its thickness $t_{LPF}$ (mm).

$$0.08 < t_{LPF}/a < 0.16 (\text{at } a < 4 \text{ μm})$$

$$0.075 < t_{LPF}/a < 0.15 (\text{at } a < 3 \text{ μm}) \qquad (26)$$

Here $t_{LPF}$ (mm) is the thickness of the optical low-pass filter having the largest thickness along the optical axis of the zoom lens with the angle of one crystal axis with respect to the optical axis being in the range of 35° to 55°, and $a$ is the horizontal pixel pitch (in μm) of the image pickup device.

Referring to a certain optical low-pass filter or an optical low-pass filter having the largest thickness among optical low-pass filters, its thickness is set in such a way that contrast becomes theoretically zero at the Nyquist threshold wavelength, i.e., at approximately a/5.88 (mm). A thicker optical low-pass filter may be effective for prevention of swindle signals such as moiré fringes, but makes it impossible to take full advantages of the resolving power that the electronic image pickup device has, while a thinner filter renders full removal of swindle signals like moiré fringes impossible. However, swindle signals like moiré fringes have close correlations with the image-formation capability of a taking lens like a zoom lens; high image-formation capability renders swindle signals like moiré fringes likely to occur. Accordingly, when the image-formation capability is high, the optical low-pass filter should preferably be somewhat thicker whereas when it is low, the optical low-pass filter should preferably be somewhat thinner.

As the pixel pitch becomes small, on the other hand, the contrast of frequency components greater than the Nyquist threshold decreases due to the influence of diffraction by the image-formation lens system and, hence, swindle signals like moiré fringes are reduced. Thus, it is preferable to reduce the thickness of the optical low-pass filter by a few % or a few tens % from a/5.88 (mm) because a rather improved contrast is obtainable at a spatial frequency lower than the frequency corresponding to the Nyquist threshold.

More preferably, $$0.075 < t_{LPF}/a < 0.15 (\text{at } a < 4 \text{ μm})$$

$$0.07 < t_{LPF}/a < 0.14 (\text{at } a < 3 \text{ μm}) \qquad (26)'$$

Most preferably, $$0.07 < t_{LPF}/a < 0.14 (\text{at } a < 4 \text{ μm})$$

$$0.065 < t_{LPF}/a < 0.13 (\text{at } a < 3 \text{ μm}) \qquad (26)''$$

If an optical low-pass filter is too thin at a<4 μm, it is then difficult to process. Thus, it is permissible to impart some thickness to the optical low-pass filter or make high the spatial frequency (cutoff frequency) where contrast reduces down to zero even when the upper limit to conditions (26), (26)' and (26)" is exceeded. In other words, it is permissible to regulate the angle of the crystal axis of the optical low-pass filter with respect to the optical axis of the zoom lens to within the range of 15° to 35° or 55° to 75°. In some cases, it is also permissible to dispense with the optical low-pass filter. In that angle range, the quantity of separation of incident light to an ordinary ray and an extraordinary ray is smaller than that around 45°, and that separation does not occur at 0° or 90° (at 90°, however, there is a phase difference because of a velocity difference between both rays—the quarter-wave principle).

As already described, when the pixel pitch becomes small, it is difficult to increase the F-number because the image-formation capability deteriorates under the influence of diffraction at a high spatial frequency that compensates for such a small pixel pitch. It is thus acceptable to use two types of aperture stops for a camera, i.e., a full-aperture stop where there is a considerable deterioration due to geometric aberrations and an aperture stop having an F-number in the vicinity of diffraction limited. It is then acceptable to dispense with such an optical low-pass filter as described before.

Especially when the pixel pitch is small and the highest image-formation capability is obtained at a full-aperture stop, etc., it is acceptable to use an aperture stop having a constantly fixed inside diameter as means for controlling the size of an incident light beam on the image pickup plane instead of using an aperture stop having a variable inside diameter or a replaceable aperture stop. Preferably in that case, at least one of lens surfaces adjacent to the aperture stop should be set such that its convex surface is directed to the aperture stop and it extends through the inside diameter portion of the aperture stop, because there is no need of providing any additional space for the stop, contributing to length reductions of the zoom optical system. It is also desirable to locate an optical element having a transmittance of up to 90% (where possible, the entrance and exit surfaces of the optical element should be defined by planar surfaces) in a space including the optical axis at least one lens away from the aperture stop or use means for replacing that optical element by another element having a different transmittance.

Alternatively, the electronic imaging system is designed in such a way as to have a plurality of apertures each of fixed aperture size, one of which can be inserted into any one of optical paths between the lens surface located nearest to the image side of the first lens group and the lens surface located nearest to the object side of the third lens group and can be replaced with another as well, so that illuminance on the image plane can be adjusted. Then, media whose transmittances with respect to 550 nm are different but less than 80% are filled in some of the plurality of apertures for light quantity control. Alternatively, when control is carried out in such a way as to provide a light quantity corresponding to such an F-number as given by $a$ (μm)/F-number<4.0, it is preferable to fill the apertures with medium whose transmittance with respect to 550 nm are different but less than 80%. In the range of the full-aperture value to values deviating from the aforesaid condition as an example, any medium is not used or dummy media having a transmittance of at least 91% with respect to 550 nm are used. In the range of the aforesaid condition, it is preferable to control the quantity of light with an ND filter or the like, rather than to decrease the diameter of the aperture stop to such an extent that the influence of diffraction appears.

Alternatively, it is acceptable to uniformly reduce the diameters of a plurality of apertures inversely with the F-numbers, so that optical low-pass filters having different frequency characteristics can be inserted in place of ND filters. As degradation by diffraction becomes worse with stop-down, it is desirable that the smaller the aperture diameter, the higher the frequency characteristics the optical low-pass filters have.

It is understood that when the relation of the full-aperture F-number at the wide-angle end to the pixel pitch $a$ (μm) used satisfies F>a, it is acceptable to dispense with the optical low-pass filter. In other words, it is permissible that the all the medium on the optical axis between the zoom lens system and the electronic image pickup device is composed of air or a non-crystalline medium alone. This is because there are little frequency components capable of producing distortions upon bending due to a deterioration in the image-formation capability by reason of diffraction and geometric aberrations.

It is noted that satisfactory zoom lenses or electronic imaging systems may be set up by suitable combinations of the above conditions and the arrangements of the zoom lens and the electronic imaging system using the same.

It is understood that only the upper limit or only the lower limit may be applied to each of the above conditions, and that the values of these conditions in each of the following examples may be extended as far as the upper or lower limits thereof.

Still other objects and advantages of the invention will in part be obvious and will in part be apparent from the specification.

The invention accordingly comprises the features of construction, combinations of elements, and arrangement of parts that will be exemplified in the construction hereinafter set forth, and the scope of the invention will be indicated in the claims.

DESCRIPTION OF THE PREFERRED EMBODIMENTS

Examples 1 to 5 of the zoom lens according to the present invention are now explained. Sectional lens configurations of Examples 1 to 5 at the wide-angle end (a), in the intermediate state (b) and at the telephoto end (c) upon focused on an object point at infinity are shown in FIGS. 1 to 5. Throughout FIGS. 1 to 5, the first lens group is indicated by G1, the second lens group by G2, a stop by S, the third lens group by G3, the fourth lens group by G4, an optical low-pass filter by LF, a cover glass for an electronic image pickup device CCD by CG, and the image plane of CCD by I. A plane-parallel plate or the taken-apart optical path-bending prism in the first lens group G1 is indicated by P. The maximum thickness of the optical low-pass filter LF used in these examples will be explained later. It is noted that instead of the near-infrared sharp cut coat, it is acceptable to use an optical low-pass filter LF coated directly with a near-infrared sharp cut coat, an infrared cut absorption filter or a transparent plane plate with a near-infrared sharp cut coat applied on its entrance surface.

Figure 6:
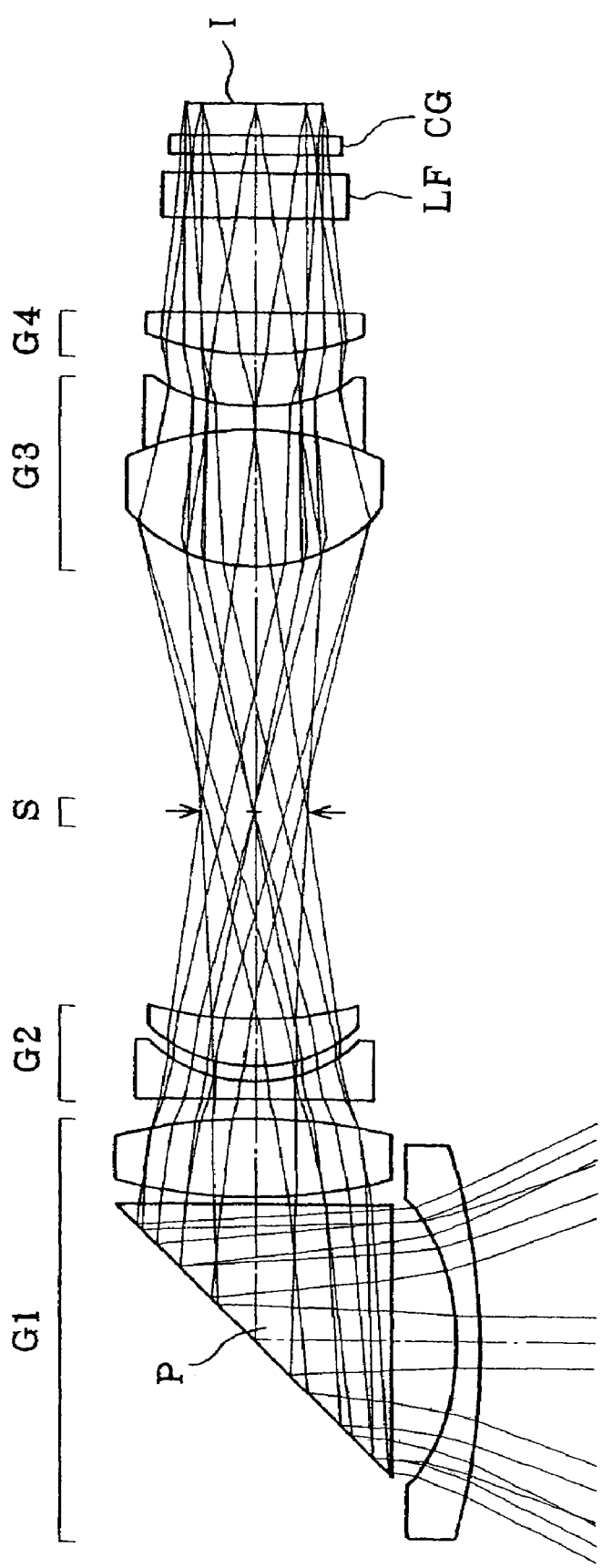
FIG. 6 is an optical path diagram for Example 1 of the zoom lens when the optical path is bent upon focused on an infinite object point at the wide-angle end.

As shown typically in FIG. 6 that is an optical path diagram for Example 1 of the zoom lens upon focused on an infinite object point at the wide-angle end, the optical path-bending prism P is configured as a reflecting prism for bending the optical path through 90°.

EXAMPLE 1

Figure 1A:
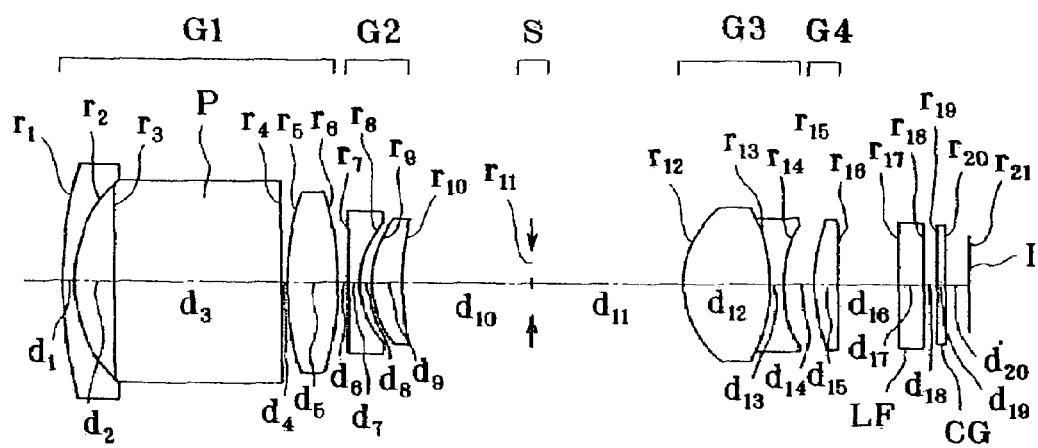
FIGS. 1(a), 1(b) and 1(c) are illustrative in section of Example 1 of the zoom lens according to the present invention at the wide-angle end (a), in an intermediate state (b) and at the telephoto end (c), respectively, when the zoom lens is focused on an object point at infinity.
Figure 1B:
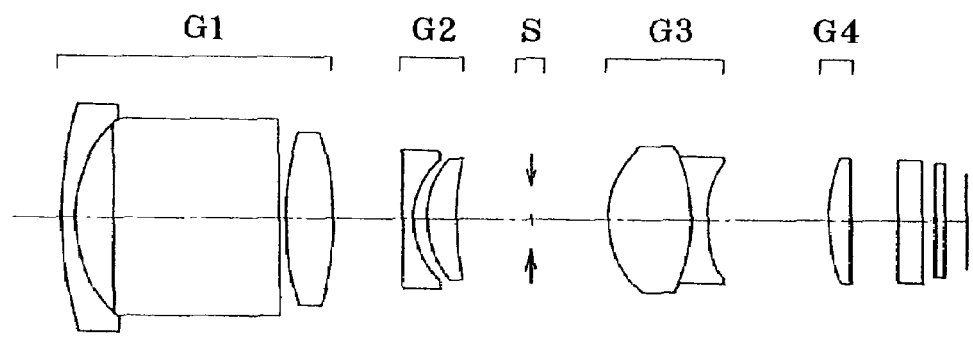
Figure 1C:
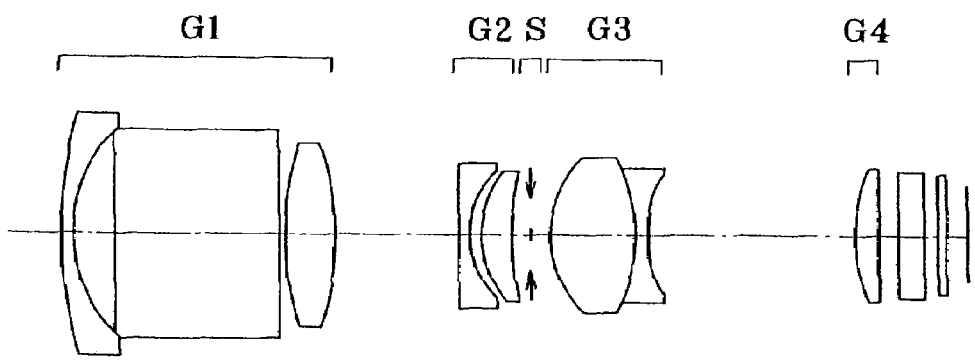

As shown in FIGS. 1(a), 1(b) and 1(c), Example 1 is directed to a zoom lens made up of a first lens group G1 composed of a negative meniscus lens element convex on its object side, an optical path-bending prism P and a double-convex positive lens element, a second lens group G2 composed of a double-concave negative lens element and a positive meniscus lens element convex on its object side, an aperture stop S, a third lens group G3 composed of a doublet consisting of a double-convex positive lens element and a double-concave lens element and a fourth lens group G4 composed of one positive meniscus lens element convex on its object side. Upon the wide-angle end to the telephoto end of the zoom lens, the first lens group G1 and the aperture stop S remain fixed, the second lens group G2 moves toward the image plane side of the zoom lens, the third lens group G3 moves toward the object side of the zoom lens, and the fourth lens group G4 moves toward the image plane side. For focusing on a nearby subject, the fourth lens group G4 moves toward the object side.

Five aspheric surfaces are used; two at both surfaces of the double-concave negative lens element in the second lens group G2, two at the surfaces nearest to the object and image plane sides of the third lens group G3 and one at the object side-surface of the positive meniscus lens element in the fourth lens group G4.

EXAMPLE 2

Figure 2A:
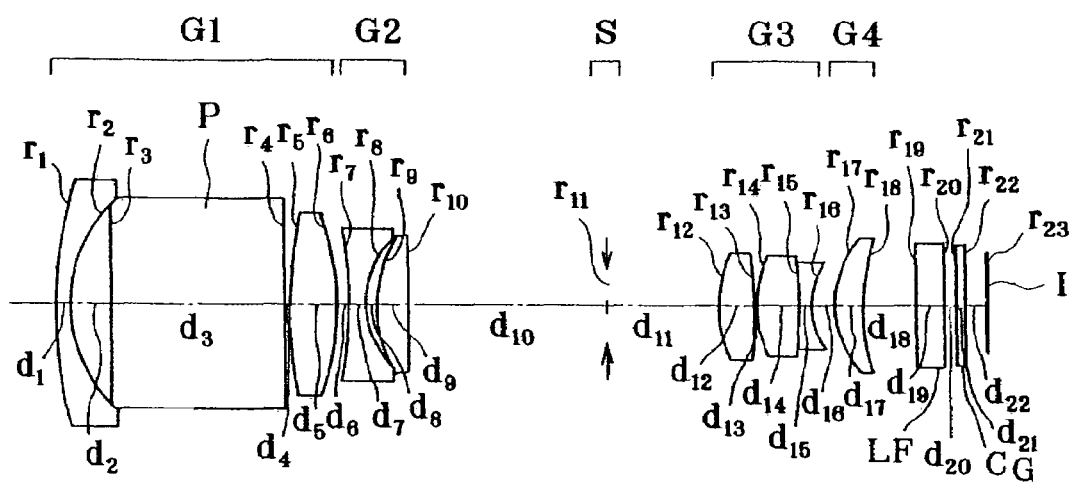
FIGS. 2(a), 2(b) and 2(c) are illustrative in section of Example 2 of the zoom lens, similar to FIGS. 1(a) to 1(c).
Figure 2B:
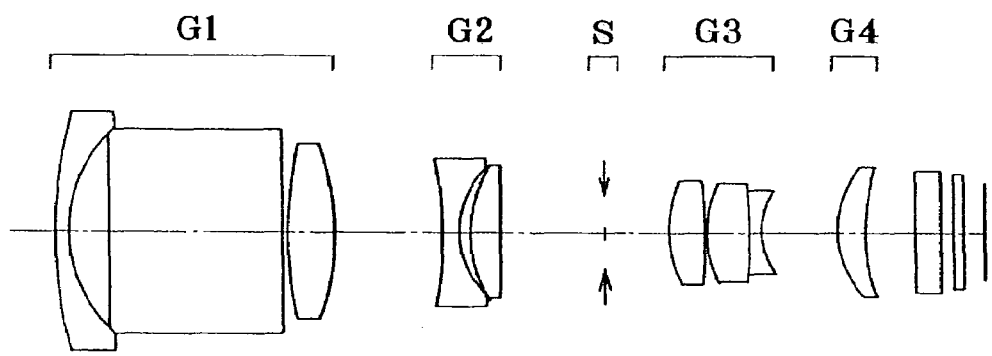
Figure 2C:
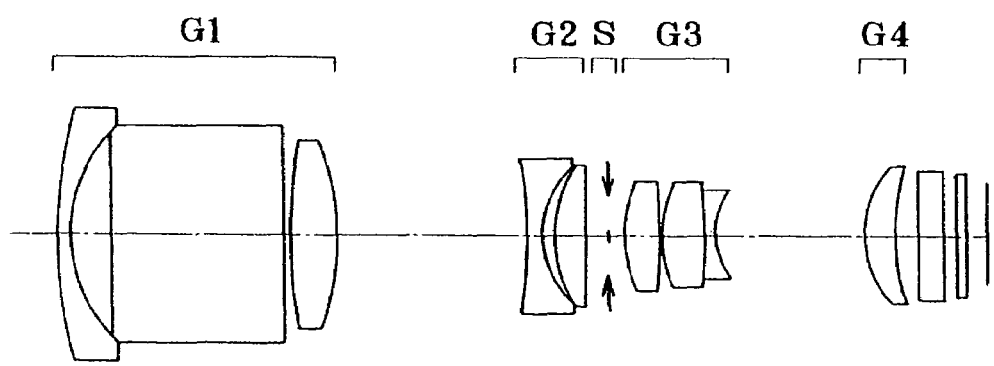

As shown in FIGS. 2(a), 2(b) and 2(c), Example 2 is directed to a zoom lens made up of a first lens group G1 composed of a negative meniscus lens element convex on its object side, an optical path-bending prism P and a double-convex positive lens element, a second lens group G2 composed of a double-concave negative lens element and a positive meniscus lens element convex on its object side, an aperture stop S, a third lens group G3 composed of a doublet consisting of a double-convex positive lens element and a double-concave negative lens element and a fourth lens group G4 composed of one positive-meniscus lens element convex on its object side. Upon the wide-angle end to the telephoto end of the zoom lens, the first lens group G1 and the aperture stop S remain fixed, the second lens group G2 moves toward the image plane side of the zoom lens, the third lens group G3 moves toward the object side of the zoom lens, and the fourth lens group G4 moves toward the image plane side. For focusing on a nearby subject, the fourth lens group G4 moves toward the object side.

Four aspheric surfaces are used; one at the image plane side-surface of the double-concave negative lens element in the second lens group G2, two at both surfaces of the double-convex positive lens element on the object side of the third lens group G3 and one at the object side-surface of the positive meniscus lens element in the fourth lens group G4.

EXAMPLE 3

Figure 3A:
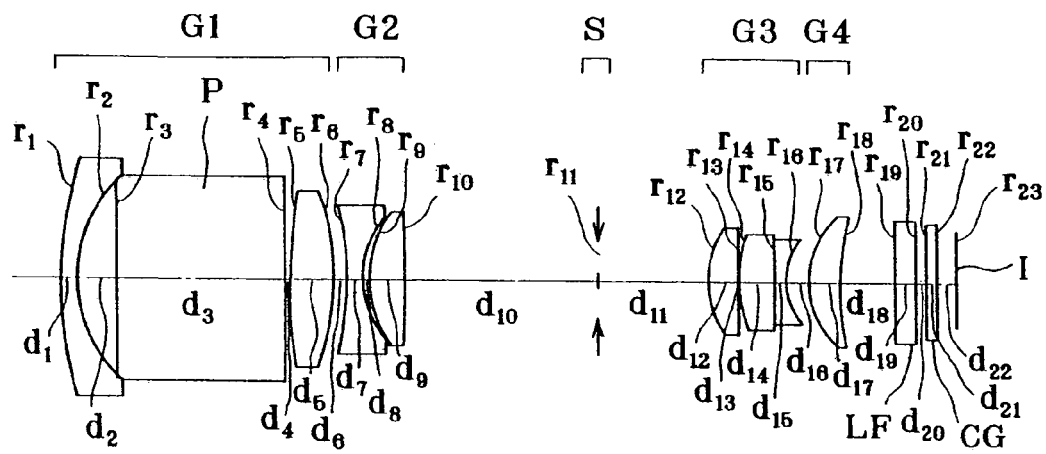
FIGS. 3(a), 3(b) and 3(c) are sections in schematic illustrative of Example 3 of the zoom lens, similar to FIGS. 1(a) to 1(c).
Figure 3B:
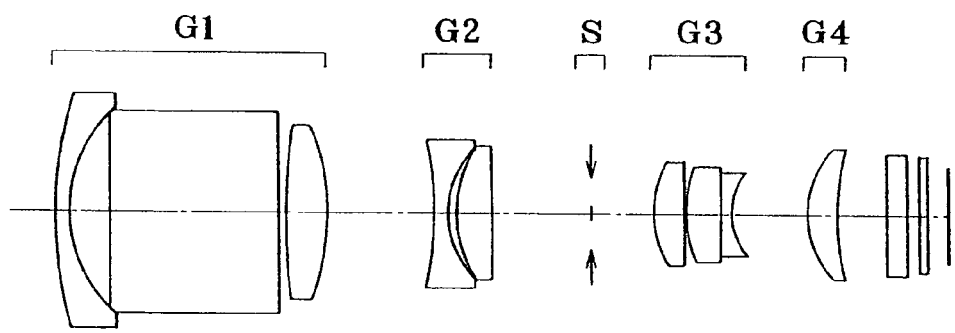
Figure 3C:
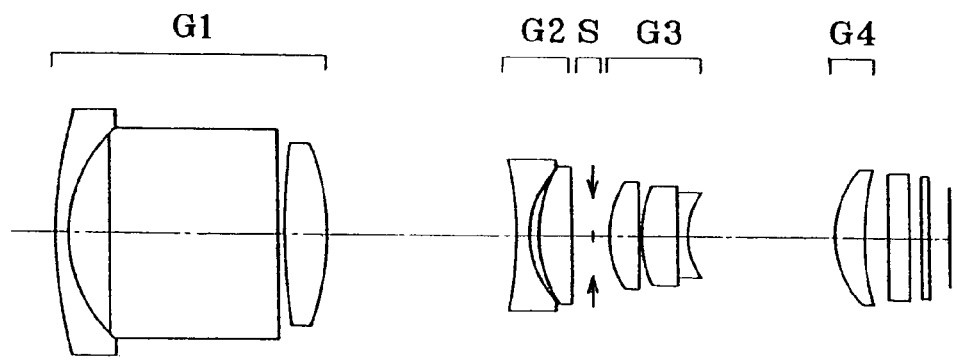

As shown in FIGS. 3(a), 3(b) and 3(c), Example 3 is directed to a zoom lens made up of a first lens group G1 composed of a negative meniscus lens element on its object side, an optical path-bending prism P and a double-convex positive lens element, a second lens group G2 composed of a double-concave negative lens element and a positive meniscus lens element convex on its object side, an aperture stop S, a third lens group G3 composed of a double-convex positive lens element and a doublet consisting of a double-convex positive lens element and a double-concave negative lens element, and a fourth lens group G4 composed of one positive meniscus lens element convex on its object side. Upon the wide-angle end to the telephoto end of the zoom lens, the first lens group G1 and the aperture stop S remain fixed, the second lens group G2 moves toward the image plane side of the zoom lens, the third lens group G3 moves toward the object side of the zoom lens, and the fourth lens group G4 moves toward the image plane side. For focusing on a nearby subject, the fourth lens group G4 moves toward the object side.

Four aspheric surfaces are used; on at the image plane side-surface of the double-concave negative lens element in the second lens group G2, two at both surfaces of the double-convex positive lens element on the object side of the third lens group G3 and one at the object side-surface of the positive meniscus lens element in the fourth lens group G4.

EXAMPLE 4

Figure 4A:
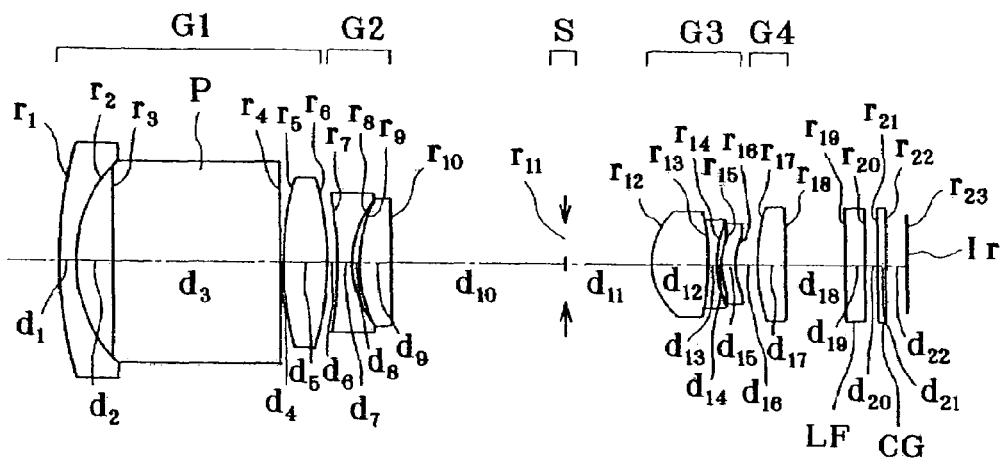
FIGS. 4(a), 4(b) and 4(c) are illustrative in section of Example 4 of the zoom lens, similar to FIGS. 1(a) to 1(c).
Figure 4B:
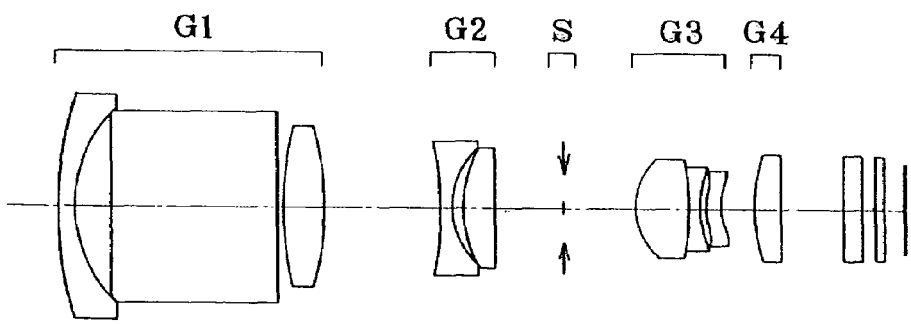
Figure 4C:
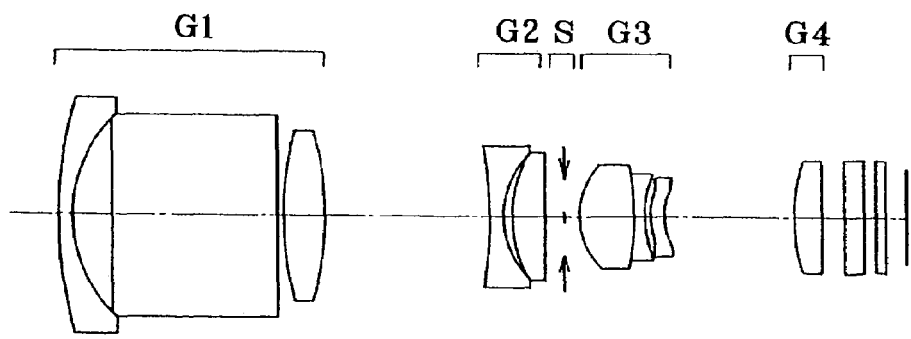

As shown in FIGS. 4(a), 4(b) and 4(c), Example 4 is directed to a zoom lens made up of a first lens group G1 composed of a negative meniscus lens element convex on its object side, an optical path-bending prism P and a double-convex positive lens element, a second lens group G2 composed of a double-concave negative lens element and a double-convex positive lens element, an aperture stop S, a third lens group G3 composed of a doublet consisting of a double-convex positive lens element and a double-concave negative lens element and a meniscus lens-element convex on its object side and a fourth lens group G4 composed of one positive meniscus lens element convex on its object side. Upon the wide-angle end to the telephoto end of the zoom lens, the first lens group G1 and the aperture stop S remain fixed, the second lens group G2 moves toward the image plane side of the zoom lens, the third lens group G3 moves toward the object side of the zoom lens, and the fourth lens group G4 moves slightly toward the object side and then toward the image plane side. For focusing on a nearby subject, the fourth lens group G4 moves toward the object side.

Five aspheric surfaces are used; two at both surfaces of the double-concave negative lens element in the second lens group G2, one at the object side-surface of the doublet in the third lens group G3 and two at both surface of the meniscus lens element in the third lens group G3.

EXAMPLE 5

Figure 5A:
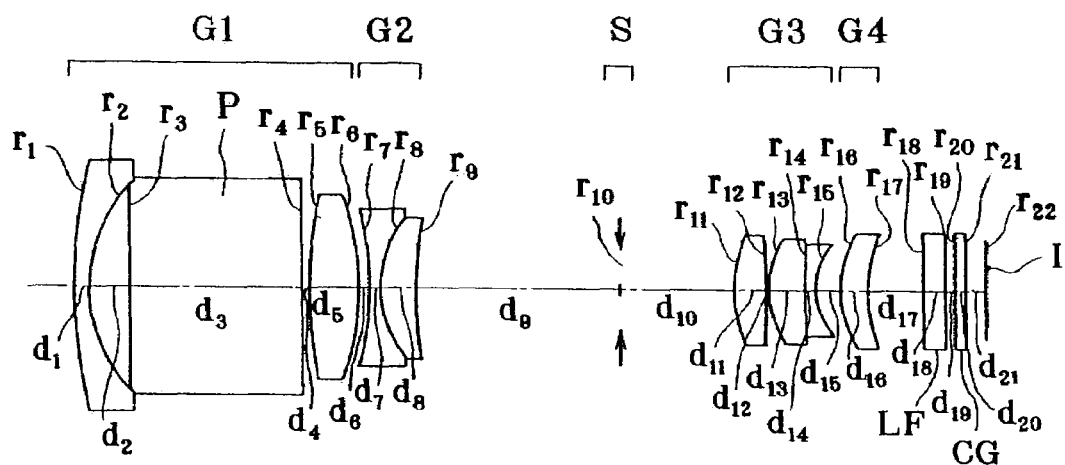
FIGS. 5(a), 5(b) and 5(c) are illustrative in section of Example 5 of the zoom lens, similar to FIGS. 1(a) to 1(c).
Figure 5B:
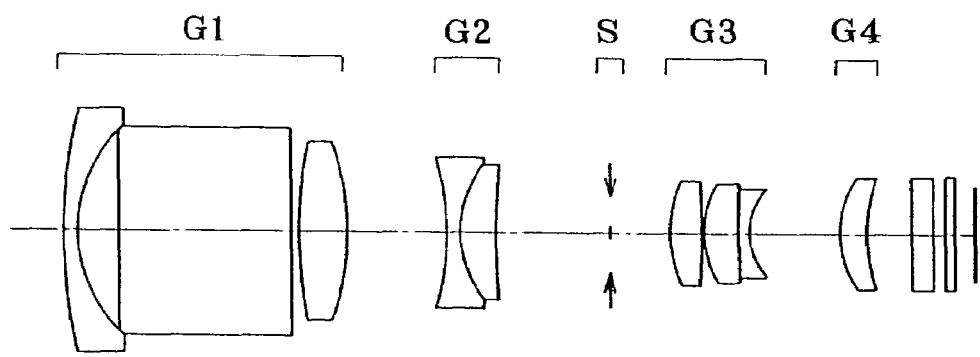
Figure 5C:
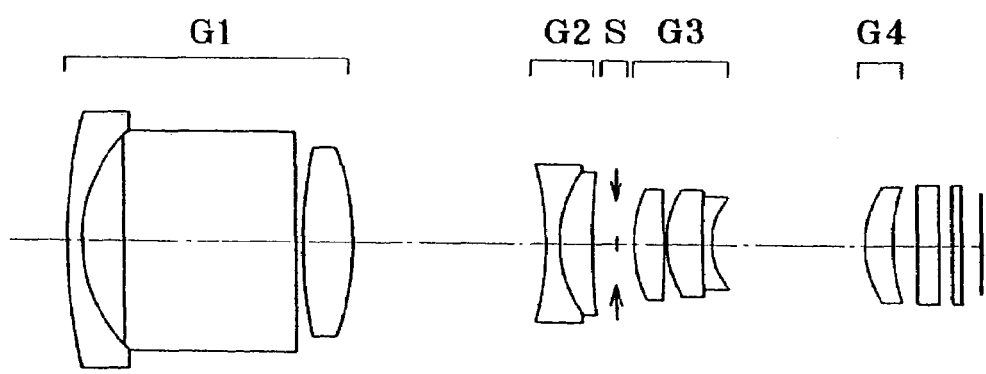

As shown in FIGS. 5(a), 5(b) and 5(c), Example 5 is directed to a zoom lens made up of a first lens group G1 composed of a negative meniscus lens element convex on its object side, an optical path-bending prism P and a double-convex positive lens element, a second lens group G2 composed of a doublet consisting of a double-concave negative lens element and a negative meniscus lens element convex on its object side, an aperture stop S, a third lens group G3 composed of a double-convex positive lens element and a doublet consisting of a positive meniscus lens element convex on its object side and a negative meniscus lens element convex on its object side and a fourth lens group G4 composed of one positive meniscus lens element convex on its object side. Upon the wide-angle end to the telephoto end of the zoom lens, the first lens group G1 and the aperture stop S remain fixed, the second lens group G2 moves toward the image plane side of the zoom lens, the third lens group G3 moves toward the object side of the zoom lens, and the fourth lens group G4 moves toward the image plane side. For focusing on a nearby subject, the fourth lens group G4 moves toward the object side.

Four aspheric surfaces are used; one at the image plane side-surface of the negative meniscus lens element in the first lens group G1, two at both surfaces of the double-convex positive lens element in the third lens group G3 and one at the object side-surface of the positive meniscus lens element in the fourth lens group G4.

The numerical data on each example are given below. Symbols used hereinafter but not hereinbefore have the following meanings:
f: focal length of the zoom lens
$F_{NO}$: F-number
ω: half angle of view
WE: wide-angle end
ST: intermediate state
TE: telephoto end
$r_1, r_2, \ldots$ : radius of curvature of each lens surface
$d_1, d_2, \ldots$ : spacing between the adjacent lens surfaces
$n_{d1}, n_{d2}, \ldots$ : d-line refractive index of each lens element
$v_{d1}, v_{d2}, \ldots$ : Abbe number of each lens element Here let x be an optical axis on condition that the direction of propagation of light is positive and y be a direction perpendicular to the optical axis. Then, aspheric configuration is given by $$x=(y^2/r)/[1+\{1-(K+1)(y/r)^2\}^{1/2}]+A_4y^4+A_6y^6+A_8y^8+A_{10}y^{10}$$

where r is a paraxial radius of curvature, K is a conical coefficient, and $A_4, A_6, A_8$ and $A_{10}$ are the fourth, sixth, eighth and tenth aspheric coefficients, respectively.

EXAMPLE 1

| | | | |
|---|---|---|---|
| $r_1 = 31.0100$ | $d_1 = 1.0000$ | $n_{d1} = 1.80100$ | $v_{d1} = 34.97$ |
| $r_2 = 9.9641$ | $d_2 = 2.9000$ | | |
| $r_3 = \infty$ | $d_3 = 12.0000$ | $n_{d2} = 1.80610$ | $v_{d2} = 40.92$ |
| $r_4 = \infty$ | $d_4 = 0.3000$ | | |
| $r_5 = 23.6950$ | $d_5 = 3.5400$ | $n_{d3} = 1.74100$ | $v_{d3} = 52.64$ |
| $r_6 = -23.6475$ | $d_6 = $ (Variable) | | |
| $r_7 = -377.9014$ | $d_7 = 0.8000$ | $n_{d4} = 1.80610$ | $v_{d4} = 40.92$ |
| (Aspheric) | | | |
| $r_8 = 6.4536$ | $d_8 = 0.7000$ | | |
| (Aspheric) | | | |

-continued

| | | | |
|---|---|---|---|
| $r_9 = 6.8913$ | $d_9 = 2.2000$ | $n_{d5} = 1.75520$ | $v_{d5} = 27.51$ |
| $r_{10} = 16.1043$ | $d_{10} = $ (Variable) | | |
| $r_{11} = \infty$ (Stop) | $d_{11} = $ (Variable) | | |
| $r_{12} = 7.5543$ | $d_{12} = 6.1695$ | $n_{d6} = 1.74320$ | $v_{d6} = 49.34$ |
| (Aspheric) | | | |
| $r_{13} = -13.0000$ | $d_{13} = 1.0000$ | $n_{d7} = 1.84666$ | $v_{d7} = 23.78$ |
| $r_{14} = 13.1848$ | $d_{14} = $ (Variable) | | |
| (Aspheric) | | | |
| $r_{15} = 12.3030$ | $d_{15} = 1.8000$ | $n_{d8} = 1.74320$ | $v_{d8} = 49.34$ |
| (Aspheric) | | | |
| $r_{16} = 1061.3553$ | $d_{16} = $ (Variable) | | |
| $r_{17} = \infty$ | $d_{17} = 1.9000$ | $n_{d9} = 1.54771$ | $v_{d9} = 62.84$ |
| $r_{18} = \infty$ | $d_{18} = 0.8000$ | | |
| $r_{19} = \infty$ | $d_{19} = 0.7500$ | $n_{d10} = 1.51633$ | $v_{d10} = 64.14$ |
| $r_{20} = \infty$ | $d_{20} = 1.3565$ | | |
| $r_{21} = \infty$ | | | |
| (Image Plane) | | | |

Aspherical Coefficients

7th surface

K = 0
$A_4 = 5.2999 \times 10^{-4}$
$A_6 = -2.1607 \times 10^{-5}$
$A_8 = 1.8300 \times 10^{-7}$
$A_{10} = 0.0000$ 8th surface K = 0
$A_4 = 5.8050 \times 10^{-4}$
$A_6 = -1.0603 \times 10^{-5}$
$A_8 = -7.5526 \times 10^{-7}$
$A_{10} = 0.0000$ 12th surface K = 0
$A_4 = 5.1734 \times 10^{-5}$
$A_6 = 1.0455 \times 10^{-6}$
$A_8 = -3.4185 \times 10^{-8}$
$A_{10} = 0.0000$ 14th surface K = 0
$A_4 = 8.4429 \times 10^{-4}$
$A_6 = 2.1473 \times 10^{-5}$
$A_8 = 7.3738 \times 10^{-7}$
$A_{10} = 0.0000$ 15th surface K = 0
$A_4 = -6.2738 \times 10^{-5}$
$A_6 = 7.6642 \times 10^{-6}$
$A_8 = -2.0106 \times 10^{-7}$
$A_{10} = 0.0000$

Zooming Data (∞)

| | WE | ST | TE |
|---|---|---|---|
| f (mm) | 6.01125 | 10.40282 | 17.99133 |
| $F_{NO}$ | 2.5820 | 3.5145 | 4.7679 |
| ω (°) | 32.7 | 19.6 | 11.4 |
| $d_6$ | 0.78801 | 4.80346 | 8.70695 |
| $d_{10}$ | 9.39271 | 5.38074 | 1.47422 |
| $d_{11}$ | 11.13320 | 5.78312 | 1.48451 |
| $d_{14}$ | 2.19671 | 8.56256 | 14.78227 |
| $d_{16}$ | 4.12457 | 3.11055 | 1.18821 |

EXAMPLE 2

| | | | |
|---|---|---|---|
| $r_1 = 31.1674$ | $d_1 = 1.0000$ | $n_{d1} = 1.80518$ | $v_{d1} = 25.42$ |
| $r_2 = 10.0082$ | $d_2 = 2.8000$ | | |

-continued

| | | | |
|---|---|---|---|
| $r_3 = \infty$ | $d_3 = 12.0000$ | $n_{d2} = 1.80610$ | $\nu_{d2} = 40.92$ |
| $r_4 = \infty$ | $d_4 = 0.3000$ | | |
| $r_5 = 38.3752$ | $d_5 = 3.3000$ | $n_{d3} = 1.77250$ | $\nu_{d3} = 49.60$ |
| $r_6 = -19.0539$ | $d_6 = $ (Variable) | | |
| $r_7 = -27.7782$ | $d_7 = 1.0000$ | $n_{d4} = 1.80610$ | $\nu_{d4} = 40.92$ |
| $r_8 = 5.9968$ (Aspheric) | $d_8 = 0.7000$ | | |
| $r_9 = 8.0742$ | $d_9 = 2.3000$ | $n_{d5} = 1.75520$ | $\nu_{d5} = 27.51$ |
| $r_{10} = -358.1053$ | $d_{10} = $ (Variable) | | |
| $r_{11} = \infty$ (Stop) | $d_{11} = $ (Variable) | | |
| $r_{12} = 8.4600$ (Aspheric) | $d_{12} = 2.5000$ | $n_{d6} = 1.74320$ | $\nu_{d6} = 49.34$ |
| $r_{13} = -116.7590$ (Aspheric) | $d_{13} = 0.1500$ | | |
| $r_{14} = 8.8060$ | $d_{14} = 3.0000$ | $n_{d7} = 1.60311$ | $\nu_{d7} = 60.64$ |
| $r_{15} = -40.0000$ | $d_{15} = 0.7000$ | $n_{d8} = 1.84666$ | $\nu_{d8} = 23.78$ |
| $r_{16} = 4.6054$ | $d_{16} = $ (Variable) | | |
| $r_{17} = 6.7337$ (Aspheric) | $d_{17} = 1.9700$ | $n_{d9} = 1.69350$ | $\nu_{d9} = 53.21$ |
| $r_{18} = 14.1820$ | $d_{18} = $ (Variable) | | |
| $r_{19} = \infty$ | $d_{19} = 1.9000$ | $n_{d10} = 1.54771$ | $\nu_{d10} = 62.84$ |
| $r_{20} = \infty$ | $d_{20} = 0.8000$ | | |
| $r_{21} = \infty$ | $d_{21} = 0.7500$ | $n_{d11} = 1.51633$ | $\nu_{d11} = 64.14$ |
| $r_{22} = \infty$ | $d_{22} = 1.3596$ | | |
| $r_{23} = \infty$ (Image Plane) | | | |

Aspherical Coefficients

8th surface $K = 0$
$A_4 = -2.7926 \times 10^{-4}$
$A_6 = -5.5281 \times 10^{-6}$
$A_8 = -3.0031 \times 10^{-7}$
$A_{10} = 0.0000$ 12th surface $K = 0$
$A_4 = -1.0549 \times 10^{-4}$
$A_6 = -1.1474 \times 10^{-6}$
$A_8 = -5.2653 \times 10^{-8}$
$A_{10} = 0.0000$ 13th surface $K = 0$
$A_4 = -4.5663 \times 10^{-5}$
$A_6 = 6.3255 \times 10^{-6}$
$A_8 = -3.7416 \times 10^{-7}$
$A_{10} = 0.0000$ 17th surface $K = 0$
$A_4 = -3.4690 \times 10^{-4}$
$A_6 = 2.1996 \times 10^{-6}$
$A_8 = -1.8422 \times 10^{-7}$
$A_{10} = 0.0000$ Zooming Data ($\infty$)

| | WE | ST | TE |
|---|---|---|---|
| f (mm) | 6.00633 | 10.39946 | 17.99885 |
| $F_{NO}$ | 2.8069 | 3.3441 | 4.0747 |
| $\omega$ (°) | 32.4 | 18.9 | 10.9 |
| $d_6$ | 0.79862 | 7.41546 | 13.08585 |
| $d_{10}$ | 13.68612 | 7.06296 | 1.39894 |
| $d_{11}$ | 7.73864 | 4.51502 | 1.19986 |
| $d_{16}$ | 1.69904 | 5.23999 | 10.27759 |
| $d_{18}$ | 3.54003 | 3.22246 | 1.50021 |

EXAMPLE 3

| | | | |
|---|---|---|---|
| $r_1 = 31.4475$ | $d_1 = 1.0000$ | $n_{d1} = 1.80518$ | $\nu_{d1} = 25.42$ |
| $r_2 = 10.0029$ | $d_2 = 2.8000$ | | |

-continued

| | | | |
|---|---|---|---|
| $r_3 = \infty$ | $d_3 = 12.0000$ | $n_{d2} = 1.80610$ | $\nu_{d2} = 40.92$ |
| $r_4 = \infty$ | $d_4 = 0.3000$ | | |
| $r_5 = 40.9109$ | $d_5 = 3.1000$ | $n_{d3} = 1.77250$ | $\nu_{d3} = 49.60$ |
| $r_6 = -18.5523$ | $d_6 = $ (Variable) | | |
| $r_7 = -27.7365$ | $d_7 = 0.9000$ | $n_{d4} = 1.80610$ | $\nu_{d4} = 40.92$ |
| $r_8 = 6.1675$ (Aspheric) | $d_8 = 0.6000$ | | |
| $r_9 = 7.8689$ | $d_9 = 2.5000$ | $n_{d5} = 1.75520$ | $\nu_{d5} = 27.51$ |
| $r_{10} = 541.9130$ | $d_{10} = $ (Variable) | | |
| $r_{11} = \infty$ (Stop) | $d_{11} = $ (Variable) | | |
| $r_{12} = 6.8303$ (Aspheric) | $d_{12} = 2.2000$ | $n_{d6} = 1.74320$ | $\nu_{d6} = 49.34$ |
| $r_{13} = -168.3254$ (Aspheric) | $d_{13} = 0.1500$ | | |
| $r_{14} = 10.3767$ | $d_{14} = 2.5000$ | $n_{d7} = 1.60311$ | $\nu_{d7} = 60.64$ |
| $r_{15} = -100.0000$ | $d_{15} = 0.7000$ | $n_{d8} = 1.84666$ | $\nu_{d8} = 23.78$ |
| $r_{16} = 4.2552$ | $d_{16} = $ (Variable) | | |
| $r_{17} = 6.4363$ (Aspheric) | $d_{17} = 2.0000$ | $n_{d9} = 1.58313$ | $\nu_{d9} = 59.38$ |
| $r_{18} = 16.8235$ | $d_{18} = $ (Variable) | | |
| $r_{19} = \infty$ | $d_{19} = 1.5000$ | $n_{d10} = 1.54771$ | $\nu_{d10} = 62.84$ |
| $r_{20} = \infty$ | $d_{20} = 0.8000$ | | |
| $r_{21} = \infty$ | $d_{21} = 0.7500$ | $n_{d11} = 1.51633$ | $\nu_{d11} = 64.14$ |
| $r_{22} = \infty$ | $d_{22} = 1.3596$ | | |
| $r_{23} = \infty$ (Image Plane) | | | |

Aspherical Coefficients

8th surface $K = 0$
$A_4 = -2.1223 \times 10^{-4}$
$A_6 = -3.9476 \times 10^{-6}$
$A_8 = -2.3492 \times 10^{-7}$
$A_{10} = 0.0000$ 12th surface $K = 0$
$A_4 = -9.9966 \times 10^{-5}$
$A_6 = -4.8770 \times 10^{-6}$
$A_8 = 7.8835 \times 10^{-7}$
$A_{10} = 0.0000$ 13th surface $K = 0$
$A_4 = 1.6853 \times 10^{-4}$
$A_6 = 4.2908 \times 10^{-6}$
$A_8 = 8.3613 \times 10^{-7}$
$A_{10} = 0.0000$ 17th surface $K = 0$
$A_4 = -3.5205 \times 10^{-4}$
$A_6 = -1.4117 \times 10^{-6}$
$A_8 = -1.1635 \times 10^{-7}$
$A_{10} = 0.0000$ Zooming Data ($\infty$)

| | WE | ST | TE |
|---|---|---|---|
| f (mm) | 6.00728 | 10.39935 | 17.99830 |
| $F_{NO}$ | 2.7463 | 3.3017 | 4.0273 |
| $\omega$ (°) | 32.4 | 18.9 | 11.0 |
| $d_6$ | 0.79769 | 7.29414 | 13.01239 |
| $d_{10}$ | 13.61214 | 7.11013 | 1.39751 |
| $d_{11}$ | 7.70485 | 4.37777 | 1.19903 |
| $d_{16}$ | 1.69969 | 5.42936 | 10.44566 |
| $d_{18}$ | 3.74084 | 3.33843 | 1.50064 |

EXAMPLE 4

| | | | |
|---|---|---|---|
| $r_1 = 32.0016$ | $d_1 = 1.0000$ | $n_{d1} = 1.75520$ | $\nu_{d1} = 27.51$ |
| $r_2 = 10.0102$ | $d_2 = 2.8000$ | | |

-continued

| | | | |
|---|---|---|---|
| $r_3 = \infty$ | $d_3 = 12.0000$ | $n_{d2} = 1.80610$ | $\nu_{d2} = 40.92$ |
| $r_4 = \infty$ | $d_4 = 0.3000$ | | |
| $r_5 = 23.5519$ | $d_5 = 3.1000$ | $n_{d3} = 1.72916$ | $\nu_{d3} = 54.68$ |
| $r_6 = -24.7555$ | $d_6 = $ (Variable) | | |
| $r_7 = -21.9861$ (Aspheric) | $d_7 = 0.9000$ | $n_{d4} = 1.80610$ | $\nu_{d4} = 40.92$ |
| $r_8 = 5.7215$ (Aspheric) | $d_8 = 0.6000$ | | |
| $r_9 = 7.9386$ | $d_9 = 2.5000$ | $n_{d5} = 1.78470$ | $\nu_{d5} = 26.29$ |
| $r_{10} = -388.5176$ | $d_{10} = $ (Variable) | | |
| $r_{11} = \infty$ (Stop) | $d_{11} = $ (Variable) | | |
| $r_{12} = 5.6674$ (Aspheric) | $d_{12} = 4.0000$ | $n_{d6} = 1.74320$ | $\nu_{d6} = 49.34$ |
| $r_{13} = -19.0000$ | $d_{13} = 0.7000$ | $n_{d7} = 1.84666$ | $\nu_{d7} = 23.78$ |
| $r_{14} = 7.7986$ | $d_{14} = 0.3000$ | | |
| $r_{15} = 3.8662$ (Aspheric) | $d_{15} = 1.0000$ | $n_{d8} = 1.69350$ | $\nu_{d8} = 53.21$ |
| $r_{16} = 3.6817$ (Aspheric) | $d_{16} = $ (Variable) | | |
| $r_{17} = 13.0325$ | $d_{17} = 2.0000$ | $n_{d9} = 1.48749$ | $\nu_{d9} = 70.23$ |
| $r_{18} = 201.0398$ | $d_{18} = $ (Variable) | | |
| $r_{19} = \infty$ | $d_{19} = 1.5000$ | $n_{d10} = 1.54771$ | $\nu_{d10} = 62.84$ |
| $r_{20} = \infty$ | $d_{20} = 0.8000$ | | |
| $r_{21} = \infty$ | $d_{21} = 0.7500$ | $n_{d11} = 1.51633$ | $\nu_{d11} = 64.14$ |
| $r_{22} = \infty$ | $d_{22} = 1.3599$ | | |
| $r_{23} = \infty$ (Image Plane) | | | |

Aspherical Coefficients

7th surface $K = 0$
$A_4 = 2.0496 \times 10^{-4}$
$A_6 = -3.4919 \times 10^{-6}$
$A_8 = 7.4208 \times 10^{-9}$
$A_{10} = 0.0000$ 8th surface $K = 0$
$A_4 = -3.6883 \times 10^{-4}$
$A_6 = 3.4613 \times 10^{-6}$
$A_8 = -9.0209 \times 10^{-7}$
$A_{10} = 0.0000$ 12th surface $K = 0$
$A_4 = 5.4882 \times 10^{-4}$
$A_6 = -1.8282 \times 10^{-5}$
$A_8 = 1.6707 \times 10^{-6}$
$A_{10} = 0.0000$ 15th surface $K = 0$
$A_4 = -8.1049 \times 10^{-3}$
$A_6 = -4.3019 \times 10^{-4}$
$A_8 = -3.1973 \times 10^{-5}$
$A_{10} = 0.0000$ 16th surface $K = 0$
$A_4 = -6.4092 \times 10^{-3}$
$A_6 = -7.3362 \times 10^{-4}$
$A_8 = 2.9898 \times 10^{-5}$
$A_{10} = 0.0000$ Zooming Data ($\infty$)

| | WE | ST | TE |
|---|---|---|---|
| f (mm) | 6.00844 | 10.40337 | 17.99810 |
| $F_{NO}$ | 2.7659 | 2.9849 | 4.0444 |
| $\omega$ (°) | 32.6 | 19.2 | 11.3 |
| $d_6$ | 0.80018 | 8.47206 | 12.07930 |
| $d_{10}$ | 12.67757 | 5.00686 | 1.39837 |
| $d_{11}$ | 6.26991 | 5.19965 | 1.19782 |
| $d_{16}$ | 1.70036 | 2.60388 | 9.42234 |
| $d_{18}$ | 4.14771 | 4.30945 | 1.49796 |

EXAMPLE 5

| | | | |
|---|---|---|---|
| $r_1 = 37.5126$ | $d_1 = 1.0000$ | $n_{d1} = 1.78470$ | $\nu_{d1} = 26.29$ |
| $r_2 = 9.9406$ (Aspheric) | $d_2 = 2.8000$ | | |
| $r_3 = \infty$ | $d_3 = 12.0000$ | $n_{d2} = 1.80610$ | $\nu_{d2} = 40.92$ |
| $r_4 = \infty$ | $d_4 = 0.3000$ | | |
| $r_5 = 33.8530$ | $d_5 = 3.1000$ | $n_{d3} = 1.77250$ | $\nu_{d3} = 49.60$ |
| $r_6 = -21.7247$ | $d_6 = $ (Variable) | | |
| $r_7 = -22.9665$ | $d_7 = 0.9000$ | $n_{d4} = 1.77250$ | $\nu_{d4} = 49.60$ |
| $r_8 = 7.9115$ | $d_8 = 2.5000$ | $n_{d5} = 1.71736$ | $\nu_{d5} = 29.52$ |
| $r_9 = 55.6404$ | $d_9 = $ (Variable) | | |
| $r_{10} = \infty$ (Stop) | $d_{10} = $ (Variable) | | |
| $r_{11} = 8.1626$ (Aspheric) | $d_{11} = 2.2000$ | $n_{d6} = 1.74320$ | $\nu_{d6} = 49.34$ |
| $r_{12} = -278.0091$ (Aspheric) | $d_{12} = 0.1500$ | | |
| $r_{13} = 7.0366$ | $d_{13} = 2.5000$ | $n_{d7} = 1.60311$ | $\nu_{d7} = 60.64$ |
| $r_{14} = 50.0000$ | $d_{14} = 0.7000$ | $n_{d8} = 1.84666$ | $\nu_{d8} = 23.78$ |
| $r_{15} = 4.2115$ | $d_{15} = $ (Variable) | | |
| $r_{16} = 6.7994$ (Aspheric) | $d_{16} = 2.0000$ | $n_{d9} = 1.58313$ | $\nu_{d9} = 59.38$ |
| $r_{17} = 13.6965$ | $d_{17} = $ (Variable) | | |
| $r_{18} = \infty$ | $d_{18} = 1.5000$ | $n_{d10} = 1.54771$ | $\nu_{d10} = 62.84$ |
| $r_{19} = \infty$ | $d_{19} = 0.8000$ | | |
| $r_{20} = \infty$ | $d_{20} = 0.7500$ | $n_{d11} = 1.51633$ | $\nu_{d11} = 64.14$ |
| $r_{21} = \infty$ | $d_{21} = 1.3586$ | | |
| $r_{22} = \infty$ (Image Plane) | | | |

Aspherical Coefficients

2nd surface $K = 0$
$A_4 = -4.8339 \times 10^{-5}$
$A_6 = 1.9771 \times 10^{-7}$
$A_8 = -1.3364 \times 10^{-8}$
$A_{10} = 0.0000$ 11th surface $K = 0$
$A_4 = -2.9041 \times 10^{-4}$
$A_6 = 2.3089 \times 10^{-5}$
$A_8 = -1.0828 \times 10^{-6}$
$A_{10} = 0.0000$ 12th surface $K = 0$
$A_4 = -1.9946 \times 10^{-4}$
$A_6 = 3.1348 \times 10^{-5}$
$A_8 = -1.4447 \times 10^{-6}$
$A_{10} = 0.0000$ 16th surface $K = 0$
$A_4 = -2.4256 \times 10^{-4}$
$A_6 = -6.3914 \times 10^{-6}$
$A_8 = 1.6763 \times 10^{-7}$
$A_{10} = 0.0000$ Zooming Data ($\infty$)

| | WE | ST | TE |
|---|---|---|---|
| f (mm) | 6.02709 | 10.40552 | 17.99646 |
| $F_{NO}$ | 2.6193 | 3.3129 | 4.0433 |
| $\omega$ (°) | 32.3 | 18.9 | 11.0 |
| $d_6$ | 0.80042 | 6.82411 | 13.07966 |
| $d_9$ | 13.67313 | 7.63416 | 1.39413 |
| $d_{10}$ | 7.94928 | 4.18630 | 1.19879 |
| $d_{15}$ | 1.69392 | 6.18157 | 10.44930 |
| $d_{17}$ | 3.50041 | 2.76626 | 1.49565 |

The values of conditions (1) to (25) in each example are enumerated below with the values of $t_{LPF}$ and L concerning condition (26). It is noted that conditions (15) to (17) mean (15-1) to (15-3), (16-1) to (16-3) and (17-1) to (17-3), respectively.

| | Example 1 | Example 2 | Example 3 | Example 4 | Example 5 |
|---|---|---|---|---|---|
| (1) | 1.80053 | 1.79882 | 1.78926 | 1.89185 | 1.68172 |
| (2) | 1.58638 | 1.62590 | 1.62599 | 1.63599 | 1.68575 |
| (3) | 1.34851 | 1.33482 | 1.33482 | 1.33482 | 1.33482 |
| (4) | 1.80610 | 1.80610 | 1.80610 | 1.80610 | 1.80610 |
| (5) | 0.91863 | 0.80674 | 0.81555 | 0.65256 | 0.69581 |
| (6) | 0.27229 | 0.29553 | 0.29058 | 0.35869 | 0.29828 |
| (7) | 0.94273 | 0.31220 | 0.32096 | 0.63812 | 0.74098 |
| (8) | 2.31092 | 2.42296 | 2.43781 | 2.46849 | 2.78836 |
| (9) | 1.62212 | 1.68225 | 1.69788 | 1.44993 | 1.75852 |
| (10) | 1.15319 | 1.17060 | 1.15739 | 1.13543 | 1.11669 |
| (11) | 1.96930 | 1.50318 | 1.52111 | 1.28830 | 1.42870 |
| (12) | 1.21850 | 0.53216 | 0.53263 | 0.44969 | 0.54976 |
| (13) | 0.30433 | 0.31196 | 0.34434 | 0.52241 | 0.29698 |
| (14) | 0.36543 | 0.28287 | 0.28291 | 0.28300 | 0.28105 |
| (15) | 1.74534 | 0.52298 | 0.41007 | 1.37605 | 0.59851 |
| (16) | −0.56154 | −0.18250 | −0.07300 | −0.38421 | 0.14600 |
| (17) | 25.56 | 36.86 | 36.86 | 25.56 | 36.86 |
| (18) | −1.02346 | −2.80812 | −2.23928 | −1.13863 | −2.97167 |
| (19) | 0.43618 | 0.43762 | 0.43731 | 0.25625 | 0.34893 |
| (20) | 0.00100 | 0.33644 | 0.37601 | −0.02491 | 0.21822 |
| (21) | 0.96642 | 0.64490 | 0.63618 | 0.58701 | 0.48756 |
| (22) | 1.0 | 1.0 | 1.0 | 1.0 | 1.0 |
| (23) | 0.04 | 0.04 | 0.04 | 0.04 | 0.04 |
| (24) | 0.0 | 0.0 | 0.0 | 0.0 | 0.0 |
| (25) | 1.06 | 1.06 | 1.06 | 1.06 | 1.06 |
| a | 3.5 | 3.9 | 3.7 | 2.9 | 2.5 |
| $t_{LPF}$ | 0.55 | 0.58 | 0.52 | 0.38 | 0.30 |
| L | 7.30 | 7.30 | 7.30 | 7.30 | 7.30 |

Referring to the numerical data about Examples 1 to 5, it is understood that the optical low-pass filter is composed of a plurality of filter elements, and the thickness of the infrared cut filter, etc. is included in such data. Thus, the maximum thickness corresponds to the value of $t_{LPF}$ in the above table, rather than the value of $t_{LPF'}$. It is also understood that any of the following ten combinations of a and $t_{LPF}$ may be used.

| | 1 | 2 | 3 | 4 | 5 |
|---|---|---|---|---|---|
| a | 3.5 | 3.9 | 3.7 | 2.9 | 2.5 |
| $t_{LPF}$ | 0.55 | 0.58 | 0.52 | 0.38 | 0.30 |

| | 6 | 7 | 8 | 9 | 10 |
|---|---|---|---|---|---|
| a | 2.8 | 2.7 | 2.6 | 3.3 | 3.1 |
| $t_{LPF}$ | 0.25 | 0.25 | 0.26 | 0.24 | 0.25 |

Figure 7:
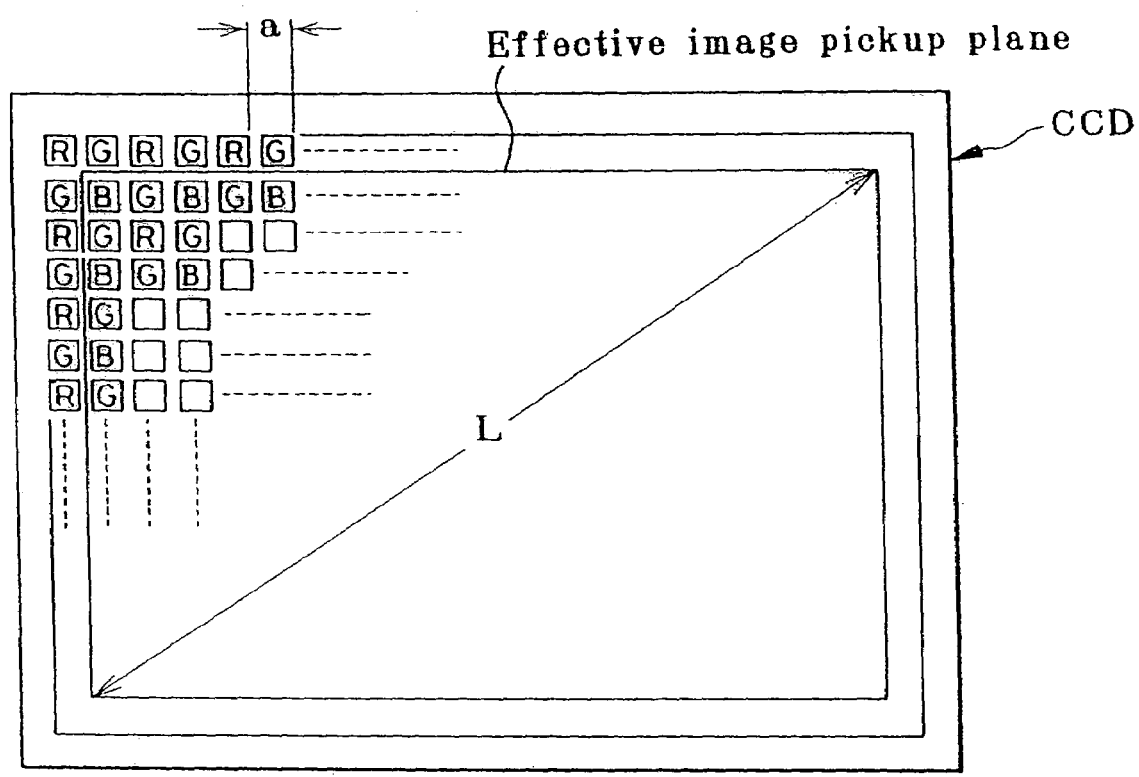
FIG. 7 is illustrative of the diagonal length of the effective image pickup plane of an electronic image pickup device upon phototaking.

Here the diagonal length L of the effective image pickup plane of the electronic image pickup device and the pixel spacing a are explained. FIG. 7 is illustrative of one exemplary pixel array for the electronic image pickup device, wherein R (red), G (green) and B (blue) pixels or four pixels, i.e., cyan, magenta, yellow and green (G) pixels (see FIG. 10) are mosaically arranged at the pixel spacing a. The "effective image pickup plane" used herein is understood to mean a certain area in the photoelectric conversion surface on an image pickup device used for the reproduction of a phototaken image (on a personal computer or by a printer). The effective image pickup plane shown in FIG. 7 is set at an area narrower than the total photoelectric conversion surface on the image pickup device, depending on the performance of the optical system used (an image circle that can be ensured by the performance of the optical system). The diagonal length L of an effective image pickup plane is thus defined by that of the effective image pickup plane. Although the image pickup range used for image reproduction may be variable, it is noted that when the zoom lens of the present invention is used on an image pickup apparatus having such functions, the diagonal length L of its effective image pickup plane varies. In that case, the diagonal length L of the effective image pickup plane according to the present invention is defined by the maximum value in the widest possible range for L.

In each example of the present invention, on the image side of the final lens group there is provided a near-infrared cut filter or an optical low-pass filter LF with a near-infrared cut coat surface applied on its entrance side. This near-infrared cut filter or near-infrared cut coat surface is designed to have a transmittance of at least 80% at 600 nm wavelength and a transmittance of up to 10% at 700 nm wavelength. More specifically, the near-infrared cut filter or the near-infrared sharp cut coat has a multilayer structure made up of such 27 layers as mentioned below; however, the design wavelength is 7.80 nm.

| Substrate | Material | Physical Thickness (nm) | λ/4 |
|---|---|---|---|
| 1st layer | $Al_2O_3$ | 58.96 | 0.50 |
| 2nd layer | $TiO_2$ | 84.19 | 1.00 |
| 3rd layer | $SiO_2$ | 134.14 | 1.00 |
| 4th layer | $TiO_2$ | 84.19 | 1.00 |
| 5th layer | $SiO_2$ | 134.14 | 1.00 |
| 6th layer | $TiO_2$ | 84.19 | 1.00 |
| 7th layer | $SiO_2$ | 134.14 | 1.00 |
| 8th layer | $TiO_2$ | 84.19 | 1.00 |
| 9th layer | $SiO_2$ | 134.14 | 1.00 |
| 10th layer | $TiO_2$ | 84.19 | 1.00 |
| 11th layer | $SiO_2$ | 134.14 | 1.00 |
| 12th layer | $TiO_2$ | 84.19 | 1.00 |
| 13th layer | $SiO_2$ | 134.14 | 1.00 |
| 14th layer | $TiO_2$ | 84.19 | 1.00 |
| 15th layer | $SiO_2$ | 178.41 | 1.33 |
| 16th layer | $TiO_2$ | 101.03 | 1.21 |
| 17th layer | $SiO_2$ | 167.67 | 1.25 |
| 18th layer | $TiO_2$ | 96.82 | 1.15 |
| 19th layer | $SiO_2$ | 147.55 | 1.05 |
| 20th layer | $TiO_2$ | 84.19 | 1.00 |
| 21st layer | $SiO_2$ | 160.97 | 1.20 |
| 22nd layer | $TiO_2$ | 84.19 | 1.00 |
| 23rd layer | $SiO_2$ | 154.26 | 1.15 |
| 24th layer | $TiO_2$ | 95.13 | 1.13 |
| 25th layer | $SiO_2$ | 160.97 | 1.20 |
| 26th layer | $TiO_2$ | 99.34 | 1.18 |
| 27th layer | $SiO_2$ | 87.19 | 0.65 |
| Air | | | |

Figure 8:
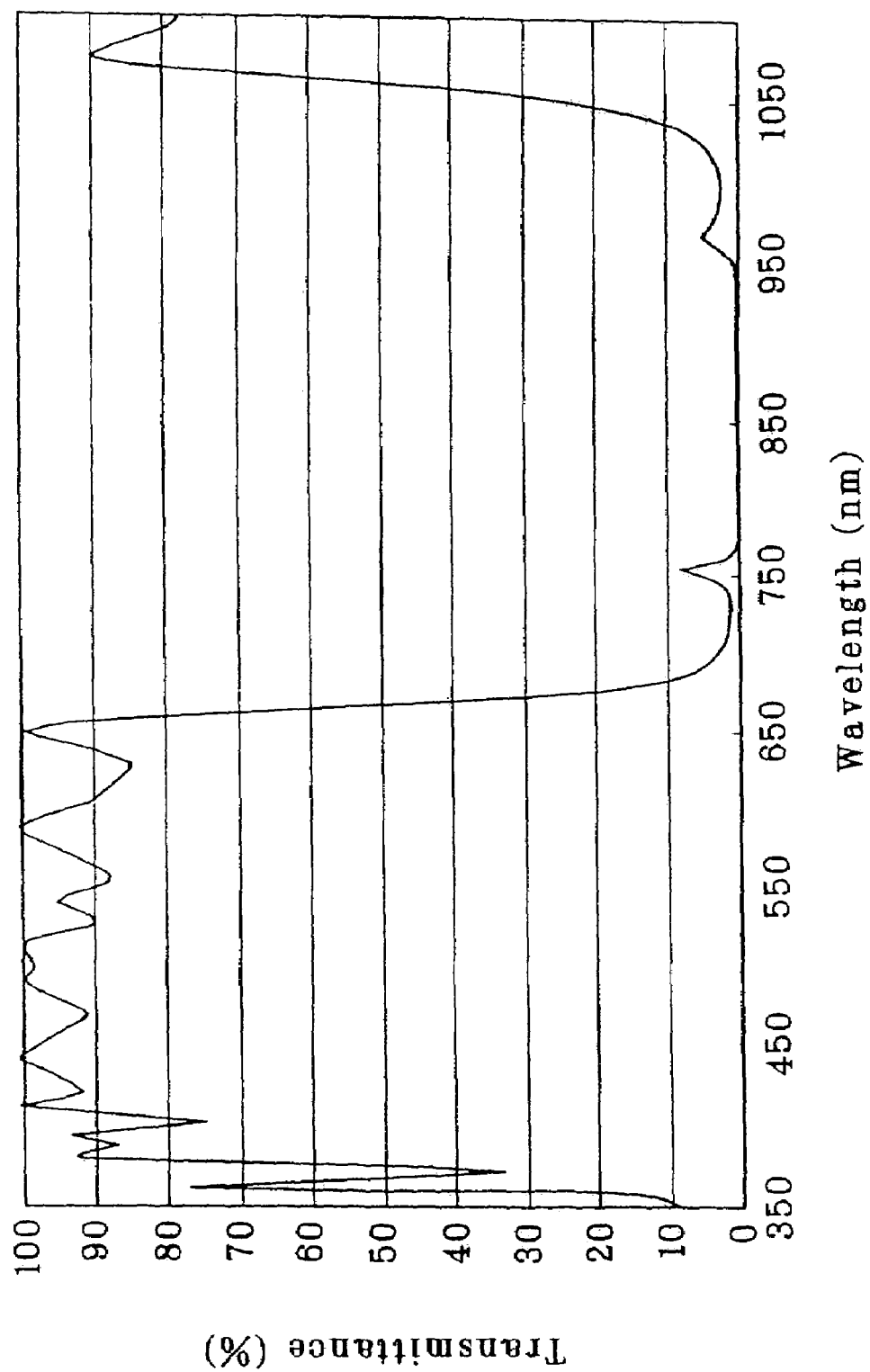
FIG. 8 is a diagram indicative of the transmittance characteristics of one example of the near-infrared sharp cut coat.

The aforesaid near-infrared sharp cut coat has such transmittance characteristics as shown in FIG. 8.

Figure 9:
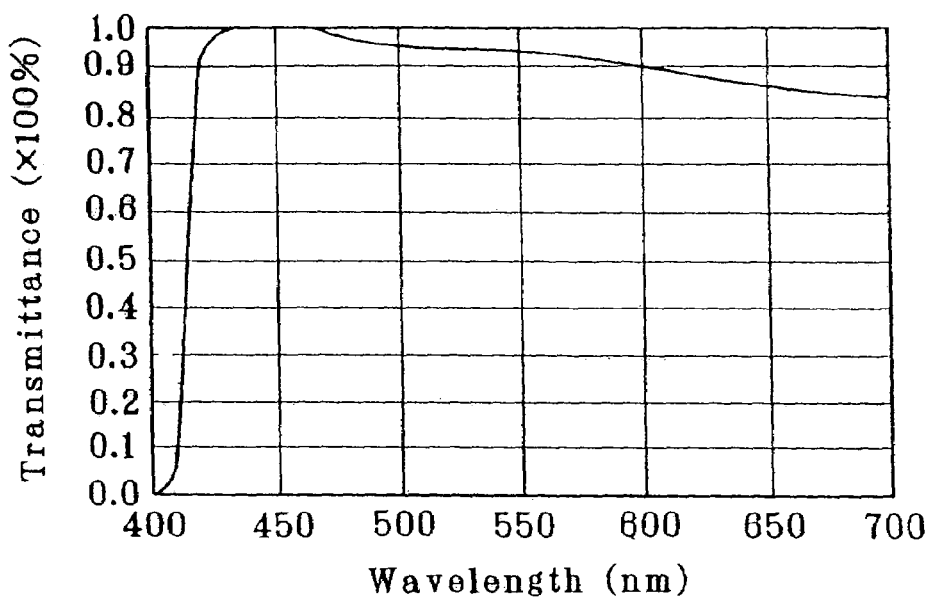
FIG. 9 is a diagram indicative of the transmittance characteristics of one example of the color filter located on the exit surface side of the low-pass filter.

The low-pass filter LF is provided on its exit surface side with a color filter or coat for reducing the transmission of colors at such a short wavelength region as shown in FIG. 9, thereby making the color reproducibility of an electronic image much higher.

Preferably, that filter or coat should be designed such that the ratio of the transmittance of 420 nm wavelength with respect to the transmittance of a wavelength in the range of 400 nm to 700 nm at which the highest transmittance is found is at least 15% and that the ratio of 400 nm wavelength with respect to the highest wavelength transmittance is up to 6%.

It is thus possible to reduce a discernible difference between the colors perceived by the human eyes and the colors of the image to be picked up and reproduced. In other words, it is possible to prevent degradation in images due to the fact that a color of short wavelength less likely to be perceived through the human sense of sight can be readily seen by the human eyes.

When the ratio of the 400 nm wavelength transmittance is greater than 6%, the short wavelength region less likely to be perceived by the human eyes would be reproduced with perceivable wavelengths. Conversely, when the ratio of the 420 nm wavelength transmittance is less than 15%, a wavelength region perceivable by the human eyes is less likely to be reproduced, putting colors in an ill-balanced state.

Such means for limiting wavelengths can be more effective for imaging systems using a complementary colors mosaic filter.

In each of the aforesaid examples, coating is applied in such a way that, as shown in FIG. 9, the transmittance for 400 nm wavelength is 0%, the transmittance for 420 nm is 90%, and the transmittance for 440 nm peaks or reaches 100%.

With the synergistic action of the aforesaid near-infrared sharp cut coat and that coating, the transmittance for 400 nm is set at 0%, the transmittance for 420 nm at 80%, the transmittance for 600 nm at 82%, and the transmittance for 700 nm at 2% with the transmittance for 450 nm wavelength peaking at 99%, thereby ensuring more faithful color reproduction.

The low-pass filter LF is made up of three different filter elements stacked one upon another in the optical axis direction, each filter element having crystal axes in directions where, upon projected onto the image plane, the azimuth angle is horizontal (=0°) and ±45° therefrom. Three such filter elements are mutually displaced by $a$ μm in the horizontal direction and by $SQRT(½)×a$ in the ±45° direction for the purpose of moiré control, wherein SQRT means a square root.

Figure 10:
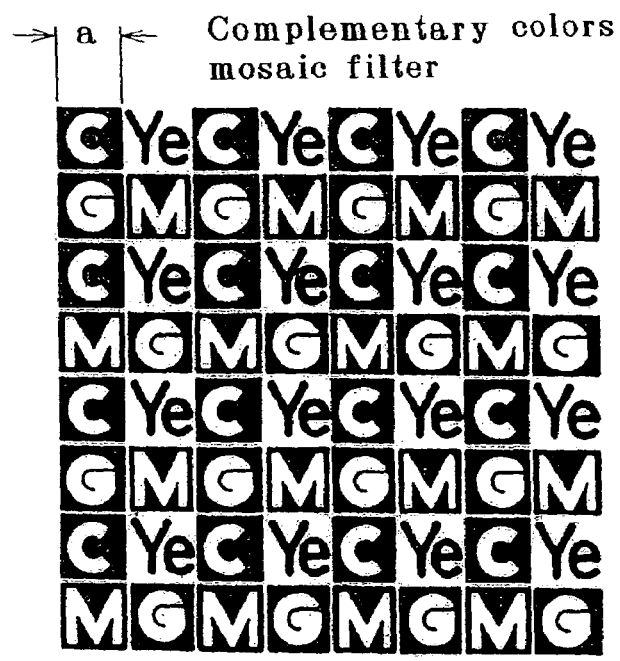
FIG. 10 is a schematic illustrative of how the color filter elements are arranged in the complementary colors mosaic filter.

The image pickup plane I of a CCD is provided thereon with a complementary colors mosaic filter wherein, as shown in FIG. 10, color filter elements of four colors, cyan, magenta, yellow and green are arranged in a mosaic fashion corresponding to image pickup pixels. More specifically, these four different color filter elements, used in almost equal numbers, are arranged in such a mosaic fashion that neighboring pixels do not correspond to the same type of color filter elements, thereby ensuring more faithful color reproduction.

To be more specific, the complementary colors mosaic filter is composed of at least four different color filter elements as shown in FIG. 10, which should preferably have such characteristics as given below.

Each green color filter element G has a spectral strength peak at a wavelength $G_P$, each yellow filter element $Y_e$ has a spectral strength peak at a wavelength $Y_P$, each cyan filter element C has a spectral strength peak at a wavelength $C_P$, and each magenta filter element M has spectral strength peaks at wavelengths $M_{P1}$ and $M_{P2}$, and these wavelengths satisfy the following conditions.

$$510 \text{ nm} < G_P < 540 \text{ nm}$$

$$5 \text{ nm} < Y_P - G_P < 35 \text{ nm}$$

$$-100 \text{ nm} < C_P - G_P < -5 \text{ nm}$$

$$430 \text{ nm} < M_{P1} < 480 \text{ nm}$$

$$580 \text{ nm} < M_{P2} < 640 \text{ nm}$$

To ensure higher color reproducibility, it is preferred that the green, yellow and cyan filter elements have a strength of at least 80% at 530 nm wavelength with respect to their respective spectral strength peaks, and the magenta filter elements have a strength of 10% to 50% at 530 nm wavelength with their spectral strength peak.

Figure 11:
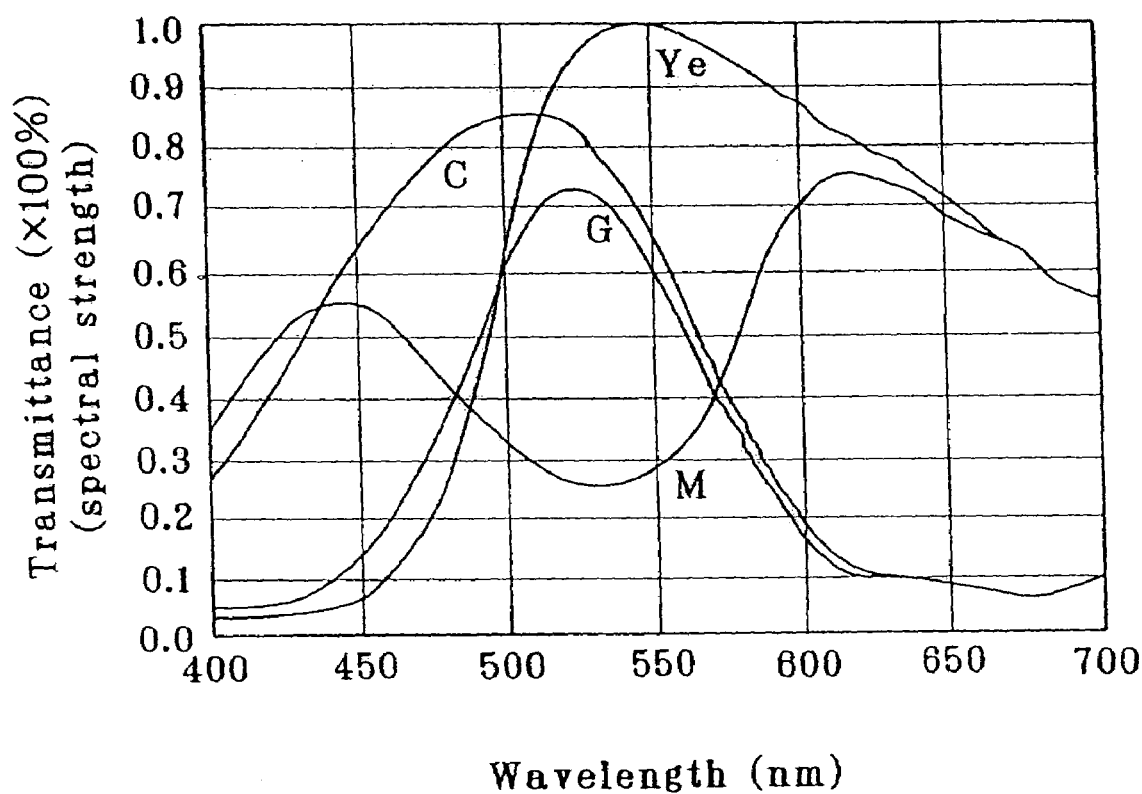
FIG. 11 is a diagram indicative of one example of the wavelength characteristics of the complementary colors mosaic filter.

One example of the wavelength characteristics in the aforesaid respective examples is shown in FIG. 11. The green filter element G has a spectral strength peak at 525 nm. The yellow filter element $Y_e$ has a spectral strength peak at 555 nm. The cyan filter element C has a spectral strength peak at 510 nm. The magenta filter element M has peaks at 445 nm and 620 nm. At 530 nm, the respective color filter elements have, with respect to their respective spectral strength peaks, strengths of 99% for G, 95% for $Y_e$, 97% for C and 38% for M.

For such a complementary colors filter, such signal processing as mentioned below is electrically carried out by means of a controller (not shown) (or a controller used with digital cameras).

For luminance signals, $$Y = |G + M + Y_e + C| \times \frac{1}{4}$$

For chromatic signals, $$R - Y = |(M + Y_e) - (G + C)|$$

$$B - Y = |(M + C) - (G + Y_e)|$$

Through this signal processing, the signals from the complementary colors filter are converted into R (red), G (green) and B (blue) signals.

In this regard, it is noted that the aforesaid near-infrared sharp cut coat may be located anywhere on the optical path, and that the number of low-pass filters LF may be either two as mentioned above or one.

Figure 12:
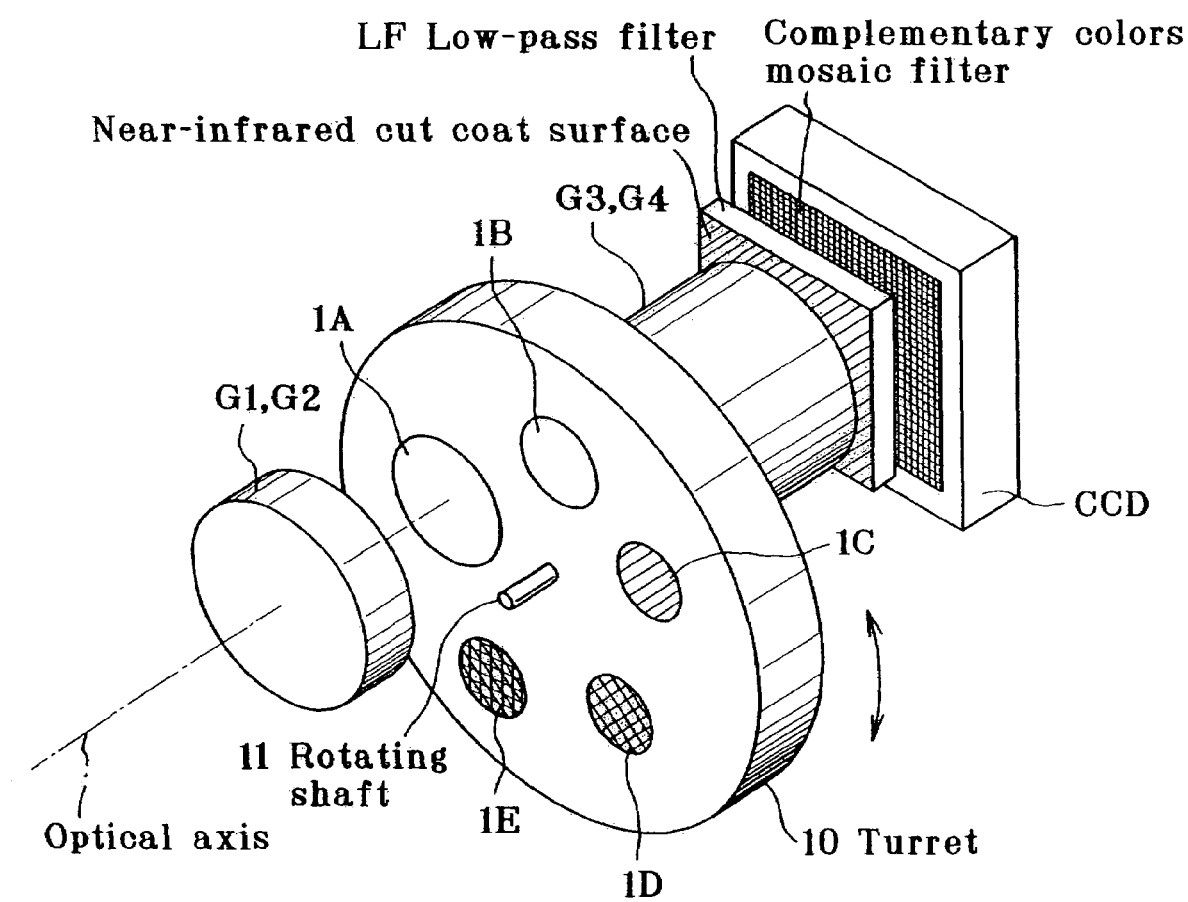
FIG. 12 is a perspective view of details of one example of an aperture stop portion used in each example.

Details of the aperture stop portion in each example are shown in FIG. 12 in conjunction with a four-group arrangement, wherein the first lens group G1 excepting the optical path-bending prism P is shown. At a stop position on the optical axis between the first lens group G1 and the second lens group G2 in the phototaking optical system, there is located a turret 10 capable of brightness control at 0 stage, −1 stage, −2 stage, −3 stage and −4 stage. The turret 10 is composed of an aperture 1A for 0 stage control, which is defined by a circular fixed space of about 4 mm in diameter (with a transmittance of 100% with respect to 550 nm wavelength), an aperture 1B for −1 stage correction, which is defined by a transparent plane-parallel plate having a fixed aperture shape with an aperture area nearly half that of the aperture 1A (with a transmittance of 99% with respect to 550 nm wavelength), and circular apertures 1C, 1D and 1E for −2, −3 and −4 stage corrections, which have the same aperture area as that of the aperture 1B and are provided with ND filters having the respective transmittances of 50%, 25% and 13% with respect to 550 nm wavelength.

By turning of the turret 10 around a rotating shaft 11, any one of the apertures is located at the stop position, thereby controlling the quantity of light.

The turret 10 is also designed that when the effective F-number $F_{no}'$ is $F_{no}' > a/0.4$ μm, an ND filter with a transmittance of less than 80% with respect to 550 nm wavelength is inserted in the aperture. Referring specifically to Example 1, the effective F-number at the telephoto end satisfies the following condition when the effective F-number becomes 9.0 at the −2 stage with respect to the stop-in (0) stage, and the then corresponding aperture is 1C, whereby any image degradation due to a diffraction phenomenon by the stop is prevented.

Figure 13A:
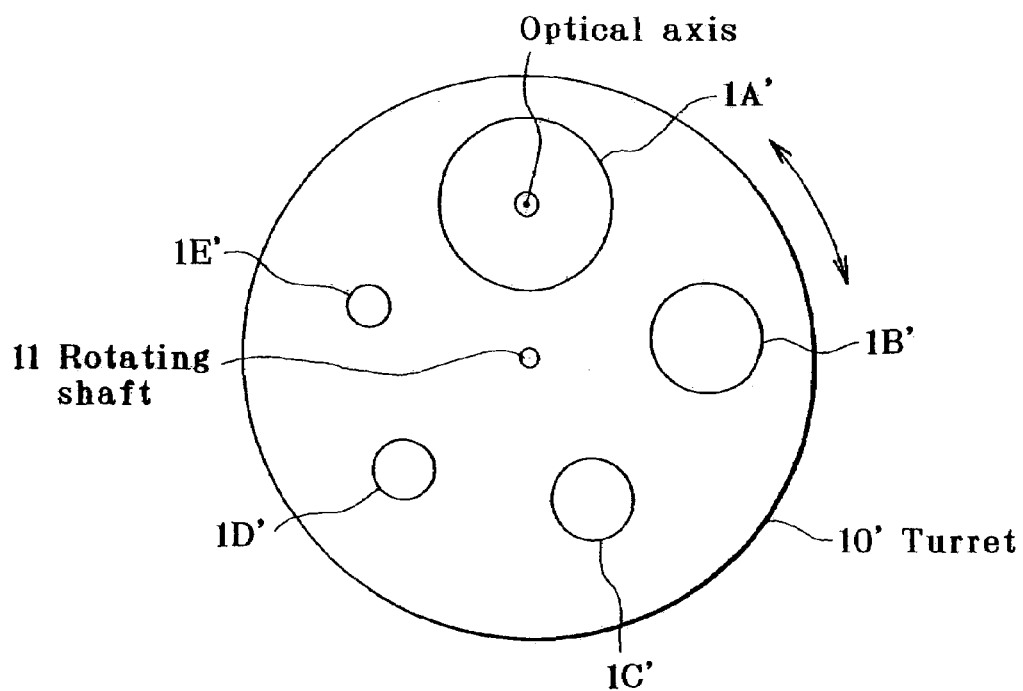
FIGS. 13(a) and 13(b) are illustrative in detail of another example of the aperture stop portion used in each example.

Instead of the turret 10 shown in FIG. 12, it is acceptable to use a turret 10' shown in FIG. 13(a). This turret 10' capable of brightness control at 0 stage, −1 stage, −2 stage, −3 stage and −4 stage is located at the aperture stop position on the optical axis between the first lens group G1 and the second lens group G2 in the phototaking optical system. The turret 10' is composed of an aperture 1A' for 0 stage control, which is defined by a circular fixed space of about 4 mm in diameter, an aperture 1B' for −1 stage correction, which is of a fixed aperture shape with an aperture area nearly half that of the aperture 1A', and apertures 1C', 1D' and 1E' for −2, −3 and −4 stage corrections, which are of fixed shape with decreasing areas in this order. By turning of the turret 10' around a rotating shaft 11, any one of the apertures is located at the stop position thereby controlling the quantity of light.

Figure 13B:
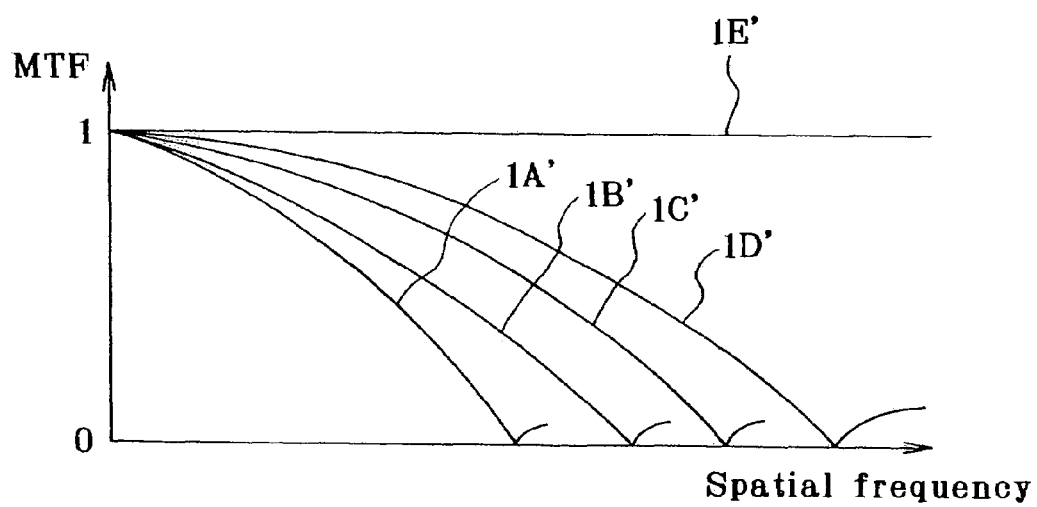

Further, optical low-pass filters having varying spatial frequency characteristics are located in association with 1A' to 1D' of plural such apertures. Then, as shown in FIG. 13(*b*), the spatial frequency characteristics of the optical filters are designed in such a way that as the aperture diameter becomes small, they become high, thereby preventing image degradations due to a diffraction phenomenon by stop-down. Each curve in FIG. 13(*b*) is indicative of the spatial frequency characteristics of the low-pass filters alone, wherein all the characteristics including diffraction by the stop are set in such a way as to be equal to one another.

The present electronic imaging system constructed as described above may be applied to phototaking systems where object images formed through zoom lenses are received at image pickup devices such as CCDs or silver-halide films, inter alia, digital cameras or video cameras as well as PCs and telephone sets which are typical information processors, in particular, easy-to-carry cellular phones. Given below are some such embodiments.

Figure 14:
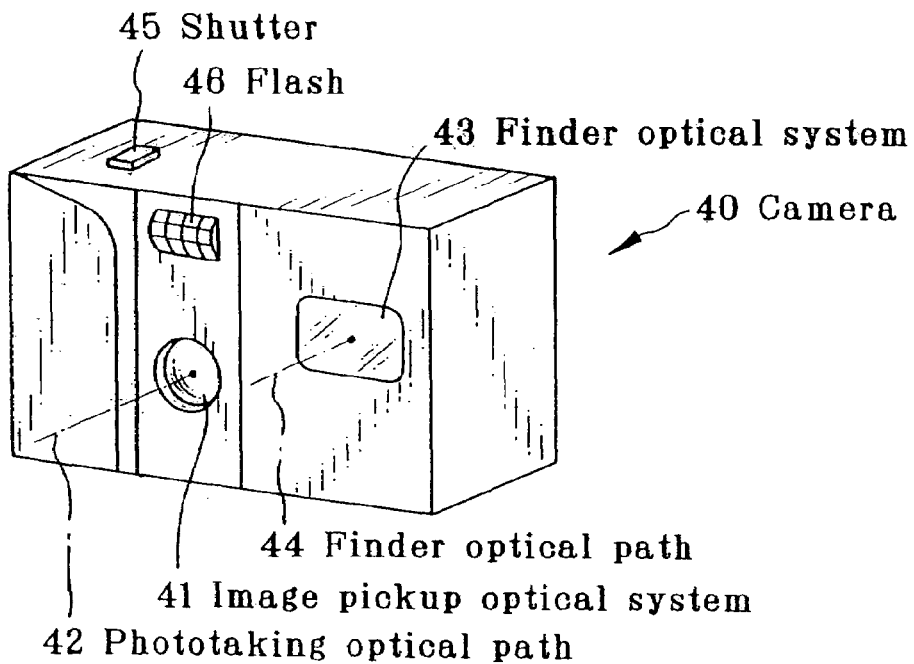
FIG. 14 is a front perspective schematic illustrative of the outside shape of a digital camera in which the optical path-bending zoom optical system of the present invention is built.
Figure 15:
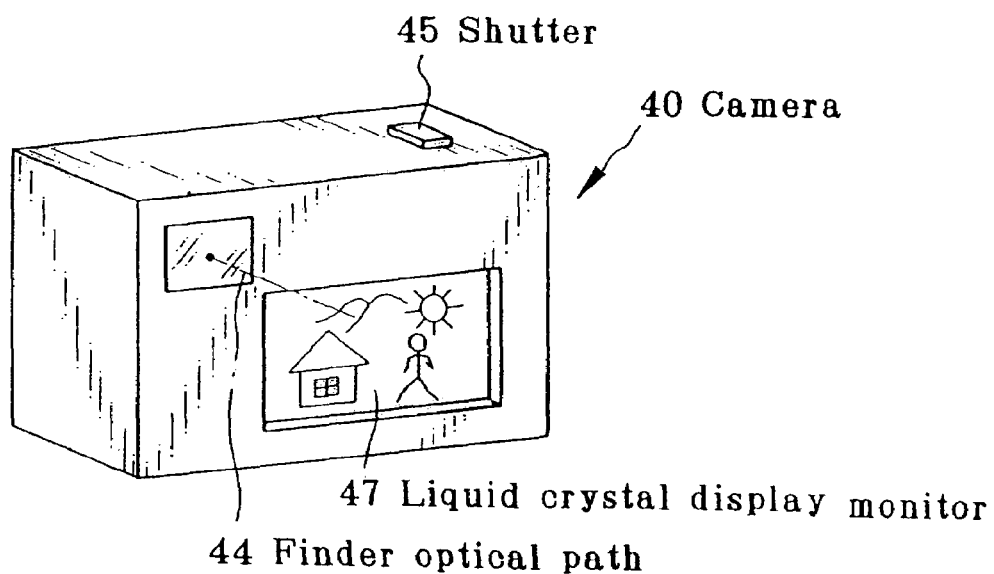
FIG. 15 is a rear perspective schematic of the digital camera of FIG. 14.
Figure 16:
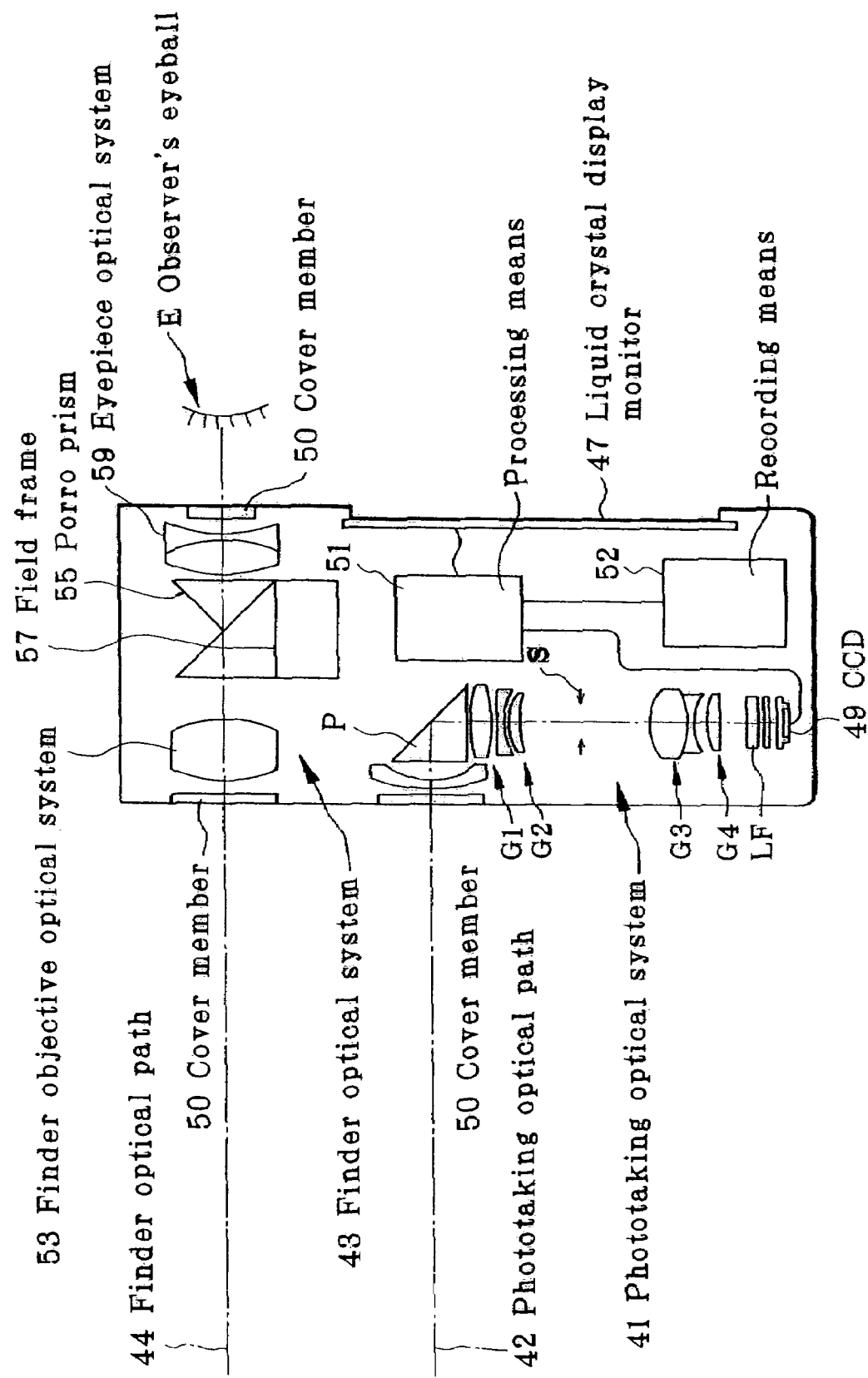
FIG. 16 is a sectional schematic of the digital camera of FIG. 14.

FIGS. 14, 15 and 16 are conceptual illustrations of a phototaking optical system 41 for digital cameras, in which the zoom lens of the present invention is built. FIG. 14 is a front perspective view of the outside shape of a digital camera 40, and FIG. 15 is a rear perspective view of the same. FIG. 16 is a horizontally sectional view of the construction of the digital camera 40. In this embodiment, the digital camera 40 comprises a phototaking optical system 41 including a phototaking optical path 42, a finder optical system 43 including a finder optical path 44, a shutter 45, a flash 46, a liquid crystal monitor 47 and so on. As the shutter 45 mounted on the upper portion of the camera 40 is pressed down, phototaking takes place through the phototaking optical system 41, for instance, the optical path-bending zoom lens according to Example 1. In this case, the optical path is bent by an optical path-bending prism P in the longitudinal direction of the digital camera 40, i.e., in the lateral direction so that the camera can be slimmed down. An object image formed by the phototaking optical system 41 is formed on the image pickup plane of a CCD 49 via a near-infrared cut filter and an optical low-pass filter LF. The object image received at CCD 49 is shown as an electronic image on the liquid crystal monitor 47 via processing means 51, which monitor is mounted on the back of the camera. This processing means 51 is connected with recording means 52 in which the phototaken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera may also be constructed in the form of a silver halide camera using a silver halide film in place of CCD 49.

Moreover, a finder objective optical system 53 is located on the finder optical path 44. An object image formed by the finder objective optical system 53 is in turn formed on the field frame 57 of a Porro prism 55 that is an image erecting member. In the rear of the Porro prism 55 there is located an eyepiece optical system 59 for guiding an erected image into the eyeball E of an observer. It is here noted that cover members 50 are provided on the entrance sides of the phototaking optical system 41 and finder objective optical system 53 as well as on the exit side of the eyepiece optical system 59.

With the thus constructed digital camera 40, it is possible to achieve high performance and cost reductions, because the phototaking optical system 41 is constructed of a fast zoom lens having a high zoom ratio at the wide-angle end with satisfactory aberrations and a back focus large enough to receive a filter, etc. therein. In addition, the camera can be slimmed down because, as described above, the optical path of the zoom lens is selectively bent in the longitudinal direction of the digital camera 40. With the optical path bent in the thus selected direction, the flash 46 is positioned above the entrance surface of the phototaking optical system 42, so that the influences of shadows on strobe shots of figures can be slackened.

In the embodiment of FIG. 16, plane-parallel plates are used as the cover members 50; however, it is acceptable to use powered lenses. It is understood that depending on ease of camera's layout, the optical path can be bent in either one of the longitudinal and lateral directions.

Figure 17:
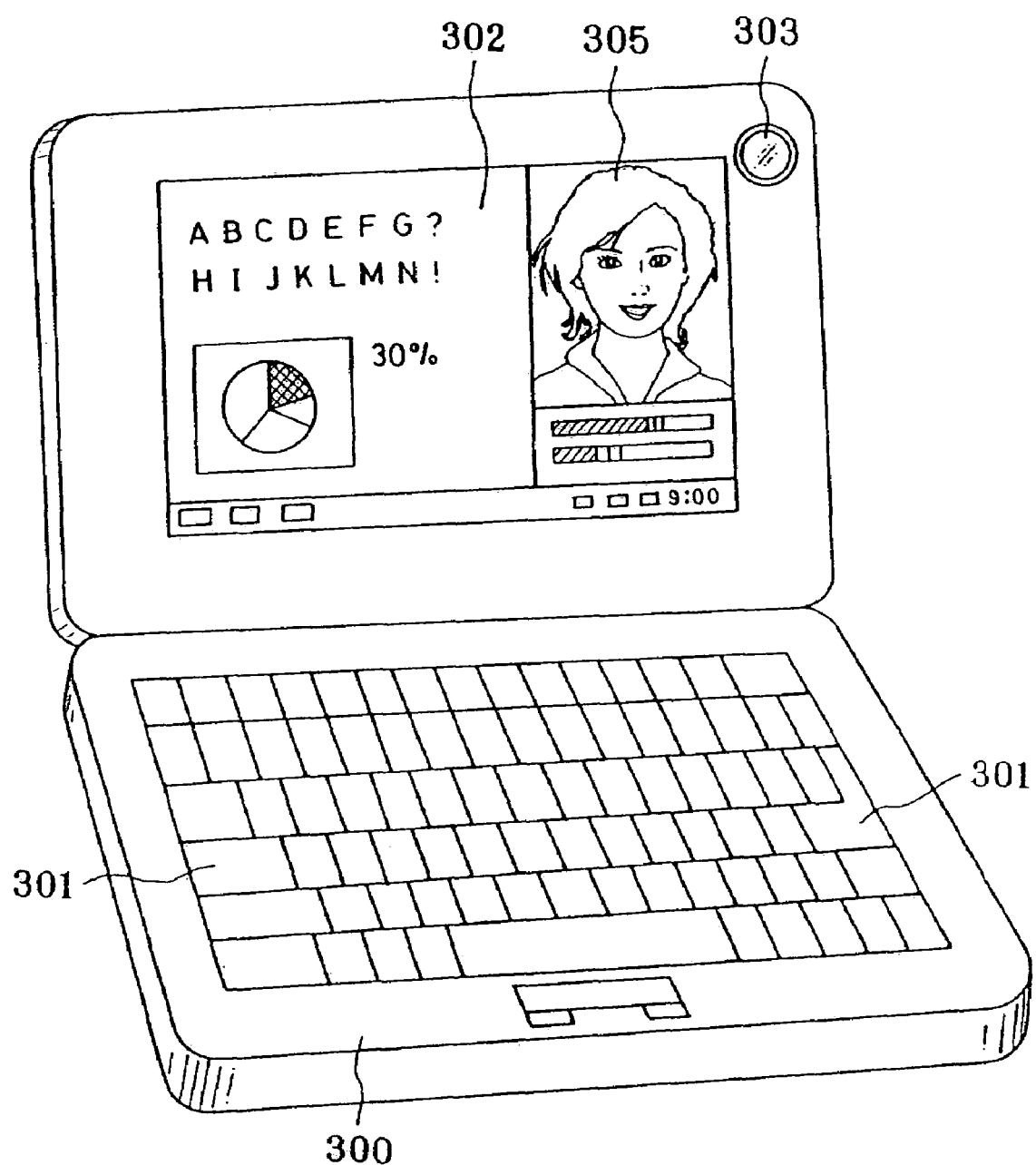
FIG. 17 is a front perspective view of an uncovered personal computer in which the optical path-bending zoom optical system of the present invention is built as an objective optical system.
Figure 18:
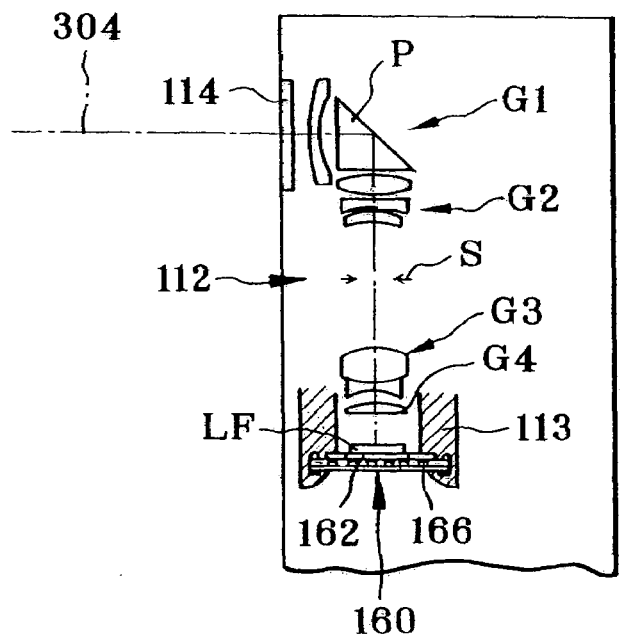
FIG. 18 is a sectional view of a phototaking optical system for a personal computer.
Figure 19:
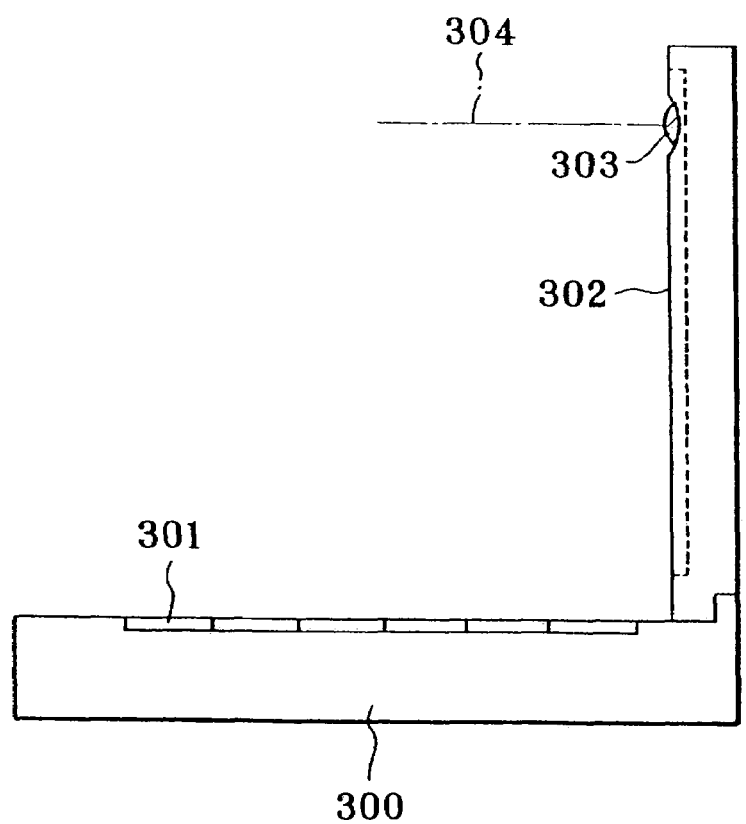
FIG. 19 is a side view of the state of FIG. 17.

FIGS. 17, 18 and 19 are illustrative of a personal computer that is one example of the information processor in which the image-formation optical system of the present invention is built as an objective optical system. FIG. 17 is a front perspective view of a personal computer 300 that is in an uncovered state, FIG. 18 is a sectional view of a phototaking optical system 303 in the personal computer 300, and FIG. 19 is a side view of the state of FIG. 17. As shown in FIGS. 17, 18 and 19, the personal computer 300 comprises a keyboard 301 via which an operator enters information therein from outside, information processing or recording means (not shown), a monitor 302 on which the information is shown for the operator, and a phototaking optical system 303 for taking an image of the operator and surrounding images. For the monitor 302, use may be made of a transmission type liquid crystal display device illuminated by backlight (not shown) from the back surface, a reflection type liquid crystal display device in which light from the front is reflected to show images, or a CRT display device. While the phototaking optical system 303 is shown as being built in the right upper portion of the monitor 302, it may be located somewhere around the monitor 302 or keyboard 301.

This phototaking optical system 303 comprises on a phototaking optical path 304 an objective lens 112 such as one represented by Example 1 of the optical path-bending zoom lens according to the present invention and an image pickup device chip 162 for receiving an image.

Here an optical low-pass filter LF is additionally applied onto the image pickup device chip 162 to form an integral imaging unit 160, which can be fitted into the rear end of a lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end (not shown) with a cover glass 114 for protection of the objective lens 112. It is here noted that driving mechanisms for the zoom lens, etc. contained in the lens barrel 113 are not shown.

An object image received at the image pickup device chip 162 is entered via a terminal 166 in the processing means of the personal computer 300, and displayed as an electronic image on the monitor 302. As an example, an image 305 taken of the operator is shown in FIG. 17. This image 305 may be displayed on a personal computer on the other end via suitable processing means and the Internet or telephone line.

Figure 20A:
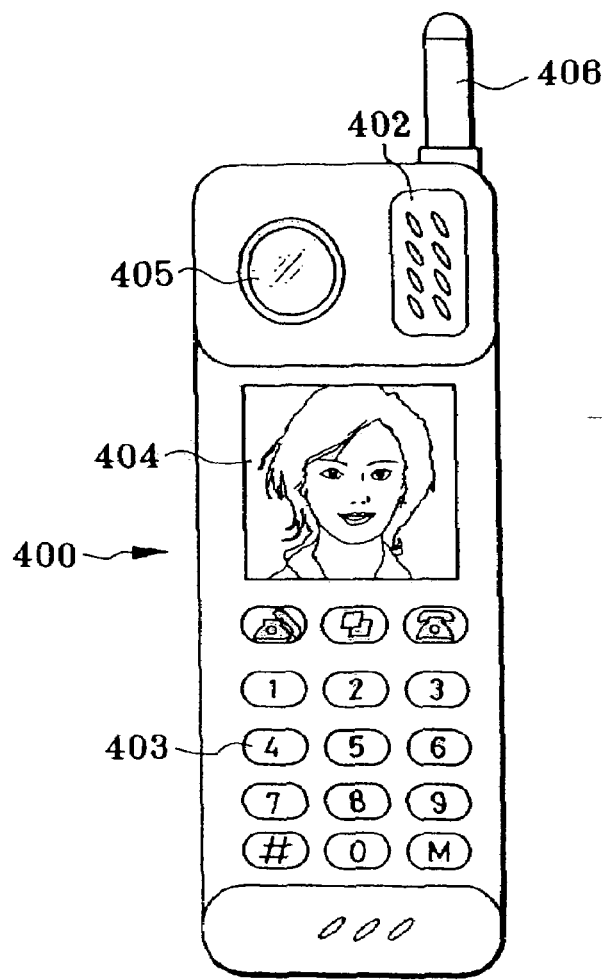
FIGS. 20(a) and 20(b) are a front and a side view of a cellular phone in which the optical path-bending zoom optical system of the present invention is built as an objective optical system.
Figure 20B:
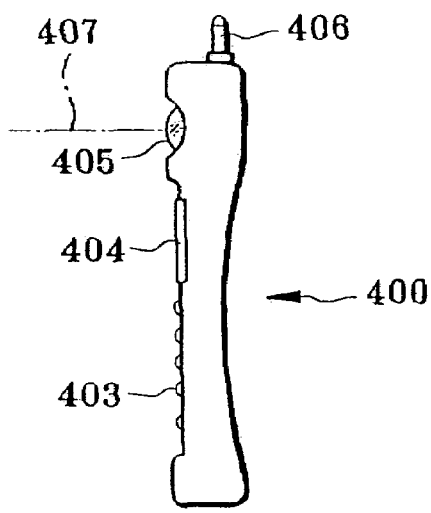
Figure 20C:
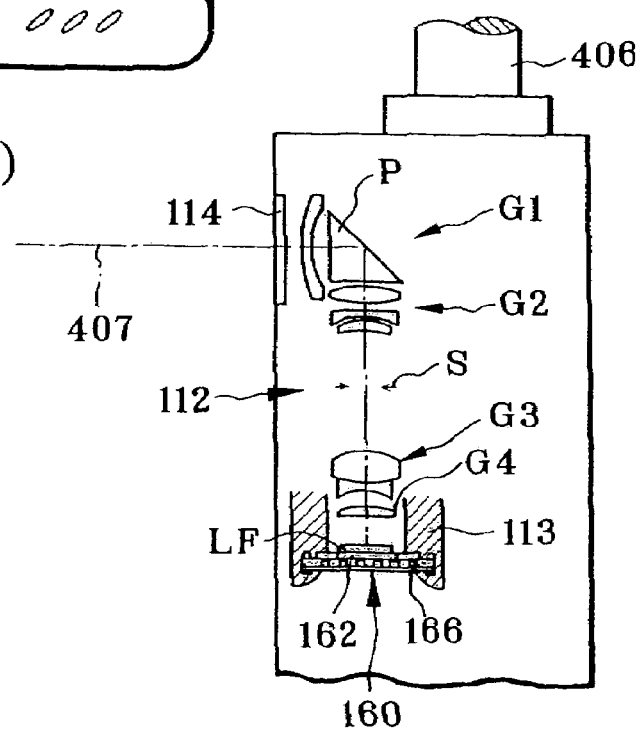
FIG. 20(c) is a sectional view of a phototaking optical system for the same.

FIGS. 20(a), 20(b) and 20(c) are illustrative of a telephone set that is one example of the information processor in which the image-formation optical system of the present invention is built in the form of a photo-taking optical system, especially a convenient-to-carry cellular phone. FIG. 20(a) and FIG. 20(b) are a front and a side view of a cellular phone 400, respectively, and FIG. 34(c) is a sectional view of a phototaking optical system 405. As shown in FIGS. 20(a), 20(b) and 20(c), the cellular phone 400 comprises a microphone 401 for entering the voice of an operator therein as information, a speaker 402 for producing the voice of the person on the other end, an input dial 403 via which the operator enters information therein, a monitor 404 for displaying an image taken of the operator or the person on the other end and indicating information such as telephone numbers, a photo-taking optical system 405, an antenna 406 for transmitting and receiving communication waves, and processing means (not shown) for processing image information, communication information, input signals, etc. Here the monitor 404 is a liquid crystal display device. It is noted that the components are not necessarily arranged as shown. The phototaking optical system 405 comprises on a phototaking optical path 407 an objective lens 112 such as one represented by Example 1 of the optical path-bending zoom lens according to the present invention and an image pickup device chip 162 for receiving an object image. These are built in the cellular phone 400.

Here an optical low-pass filter LF is additionally applied onto the image pickup device chip 162 to form an integral imaging unit 160, which can be fitted into the rear end of a lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end (not shown) with a cover glass 114 for protection of the objective lens 112. It is here noted that driving mechanisms for the zoom lens, etc. contained in the lens barrel 113 are not shown.

An object image received at the image pickup device chip 162 is entered via a terminal 166 in processing means (not shown), so that the object image can be displayed as an electronic image on the monitor 404 and/or a monitor at the other end. The processing means also include a signal processing function for converting information about the object image received at the image pickup device chip 162 into transmittable signals, thereby sending the image to the person at the other end.

The present invention provides a zoom lens that is well received at a collapsible lens mount with reduced thickness, has a high zoom ratio and shows excellent image-formation capability even upon rear-focusing. With this zoom lens, it is possible to thoroughly slim down video cameras or digital cameras.

What is claimed is:

1. A zoom lens, comprising:
   a first lens group,
   a stop located on an image side of said zoom lens with respect to said first lens group, and
   two lens groups located on an image side of said zoom lens with respect to said stop, wherein:
   a distance between said two lens groups changes during zooming,
   said first lens group comprises a positive lens element and a reflecting optical element for bending an optical path,
   a total number of positive lens elements in said first lens group is one,
   a total number of lens groups located on the image side with respect to said stop is two, and
   said reflecting optical element is a prism that satisfies condition (4):

$$1.55 < n_{pri} \quad (4)$$

where $n_{pri}$ is a d-line refractive index of a medium of said prism in said first lens group,
   wherein an object-side lens group of said two lens groups located on the image side with respect to said stop is a positive lens group that has positive refracting power and moves during zooming.

2. The zoom lens according to claim 1, wherein said positive lens group on the image side with respect to said stop includes a cemented lens.

3. A zoom lens, comprising:
   a first lens group,
   a stop located on an image side of said zoom lens with respect to said first lens group, and
   two lens groups located on an image side of said zoom lens with respect to said stop, wherein:
   a distance between said two lens groups changes during zooming,
   said first lens group comprises a positive lens element and a reflecting optical element for bending an optical path,
   a total number of positive lens elements in said first lens group is one,
   a total number of lens groups located on the image side with respect to said stop is two, and
   said reflecting optical element is a prism that satisfies condition (4):

$$1.55 < n_{pri} \quad (4)$$

where $n_{pri}$ is a d-line refractive index of a medium of said prism in said first lens group,
   wherein the zoom lens satisfies the condition F>a, and wherein F is full-aperture F-number at the wide-angle end and a is pixel pitch magnitude in μm.

* * * * *